(12) United States Patent
Jang et al.

(10) Patent No.: US 9,575,353 B2
(45) Date of Patent: Feb. 21, 2017

(54) LIQUID CRYSTAL DISPLAY

(71) Applicant: Samsung Display Co., Ltd., Yongin (KR)

(72) Inventors: Eun Je Jang, Hwaseong-si (KR); Sung In Ro, Hwaseong-si (KR); Young Gu Kang, Hwaseong-si (KR); Hyun Wuk Kim, Yongin-si (KR); Ock Soo Son, Seoul (KR); Jean Ho Song, Yongin-si (KR); Sung Jin Hong, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 175 days.

(21) Appl. No.: 14/250,028

(22) Filed: Apr. 10, 2014

(65) Prior Publication Data
US 2014/0313463 A1    Oct. 23, 2014

(30) Foreign Application Priority Data

Apr. 10, 2013    (KR) .................. 10-2013-0039529
Dec. 17, 2013    (KR) .................. 10-2013-0157117

(51) Int. Cl.
*G02F 1/1333*    (2006.01)
*G02F 1/1335*    (2006.01)
(Continued)

(52) U.S. Cl.
CPC ... *G02F 1/133512* (2013.01); *G02F 1/133345* (2013.01); *G02F 1/136209* (2013.01);
(Continued)

(58) Field of Classification Search
CPC .................... G02F 1/133345; G02F 1/133512
See application file for complete search history.

(56) References Cited

U.S. PATENT DOCUMENTS 6,038,006 A    3/2000    Sasaki et al.
6,057,896 A *  5/2000    Rho .................. G02F 1/133345
                                                                    257/59
(Continued)

FOREIGN PATENT DOCUMENTS

EP    2573617        3/2013
KR    10-0250971    4/2000
(Continued)

OTHER PUBLICATIONS

European Search Report issued Jul. 23, 2014, in European Patent Application No. 14164241.3.
(Continued)

*Primary Examiner* — Richard Kim
(74) *Attorney, Agent, or Firm* — H.C. Park & Associates, PLC

(57) ABSTRACT

A liquid crystal display includes a first substrate, a gate line disposed on the first substrate, a data line disposed on the first substrate, a first passivation layer disposed on the gate line and the data line, a color filter disposed on the first passivation layer, a common electrode disposed on the color filter, a light blocking member disposed directly on or directly below the common electrode, a second passivation layer disposed on the common electrode and the light blocking member, and a pixel electrode disposed on the second passivation layer.

38 Claims, 18 Drawing Sheets

(51) Int. Cl.
*G02F 1/1362* (2006.01)
*G02F 1/1343* (2006.01)
*G02F 1/136* (2006.01)

(52) U.S. Cl.
CPC ............... *G02F 1/134363* (2013.01); *G02F 2001/13606* (2013.01); *G02F 2001/134372* (2013.01); *G02F 2001/136222* (2013.01)

(56) References Cited

U.S. PATENT DOCUMENTS

| | | | |
|---|---|---|---|
| 7,528,917 B2 | 5/2009 | Kim et al. | |
| 7,724,337 B2 | 5/2010 | Konno | |
| 8,218,110 B2 | 7/2012 | Song et al. | |
| 8,373,833 B2 | 2/2013 | Song et al. | |
| 2001/0026344 A1 | 10/2001 | Sakamoto | |
| 2003/0156237 A1* | 8/2003 | Lin | G02F 1/133707 349/110 |
| 2006/0139516 A1* | 6/2006 | Park | G02F 1/133512 349/110 |
| 2006/0232728 A1* | 10/2006 | Kim | G02F 1/1333 349/106 |
| 2006/0290829 A1 | 12/2006 | Kim | |
| 2009/0033841 A1* | 2/2009 | Li | G02F 1/133516 349/106 |
| 2010/0051951 A1* | 3/2010 | Lee | G02F 1/136209 257/59 |
| 2011/0051055 A1* | 3/2011 | Lee | G02F 1/1323 349/106 |
| 2011/0096259 A1* | 4/2011 | Lee | G02B 5/201 349/41 |
| 2011/0159622 A1* | 6/2011 | Jeong | H01L 27/1214 438/34 |
| 2011/0181805 A1 | 7/2011 | Nagami | |
| 2011/0216275 A1* | 9/2011 | Lee | G02F 1/1335 349/106 |
| 2012/0008073 A1 | 1/2012 | Ota | |
| 2012/0038873 A1 | 2/2012 | Kim et al. | |
| 2012/0105778 A1* | 5/2012 | Fujiyoshi | G02F 1/134363 349/106 |
| 2012/0181557 A1 | 7/2012 | Kim et al. | |
| 2012/0218501 A1* | 8/2012 | Lee | G02F 1/134309 349/139 |
| 2013/0033654 A1* | 2/2013 | Kim | G02F 1/133509 349/38 |
| 2013/0222723 A1* | 8/2013 | Kim | H01L 33/58 349/40 |

FOREIGN PATENT DOCUMENTS

| | | |
|---|---|---|
| KR | 10-2008-0042466 | 5/2008 |
| KR | 10-2011-0064272 | 6/2009 |
| KR | 10-2011-0054727 | 5/2011 |
| KR | 10-2011-0105612 | 9/2011 |
| KR | 10-2011-0132724 | 12/2011 |

OTHER PUBLICATIONS

European Search Report dated Nov. 17, 2014, in European Patent Application No. 14164241.3.

* cited by examiner (CONVENTIONAL LIQUID CRYSTAL DISPLAY)

LIQUID CRYSTAL DISPLAY

CROSS-REFERENCE TO RELATED APPLICATIONS

This application claims priority to and the benefit of Korean Patent Application No. 10-2013-0039529, filed on Apr. 10, 2013, and Korean Patent Application No. 10-2013-0157117, filed on Dec. 17, 2013, each of which is the entire contents of which are incorporated herein by reference.

BACKGROUND

Field

Exemplary embodiments relate to a display technology, and, more particularly, to liquid crystal displays.

Discussion

Liquid crystal displays are a common type of panel display and are typically configured to apply a voltage to an electrode to rearrange liquid crystal molecules of a liquid crystal layer to adjust an amount of transmitted light. Conventional liquid crystal displays may be relatively thin, but side visibility may be lower than frontal visibility. As such, various types of liquid crystal alignment techniques and driving methods have been developed to increase the side visibility of traditional liquid crystal displays. For instance, to achieve a wide viewing angle, a liquid crystal display including a pixel electrode and a common electrode formed on one substrate has attracted attention. In such a liquid crystal display, at least one of two field generating electrodes of a pixel electrode and a common electrode may have a plurality of cutouts and a plurality of branch electrodes defined by the plurality of cutouts.

To prevent (or at least reduce) light leakage in a non-display area of a liquid crystal display, a light blocking member may be utilized. If the light blocking member is formed on a substrate that faces another substrate on which the pixel electrode is formed, it may be difficult to prevent the light leakage in the non-display area due to misalignment of the two substrates. This may reduce the transmittance of the display area. Therefore, the light blocking member may be formed on the substrate on which the pixel electrode is formed. However, if the light blocking member overlaps the field generating electrode, such as the pixel electrode or the common electrode, with an insulating layer disposed therebetween, a parasitic capacitance may be formed between the light blocking member and the field generating electrode. This may deteriorate the display quality of the liquid crystal display device.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a liquid crystal display configured to remove (or prevent) a parasitic capacitance, which may otherwise occur between a light blocking member and a pixel electrode, when a pixel electrode, a common electrode, and a light blocking member are formed on the same substrate. This may, in turn, prevent display quality from being deteriorated.

Additional aspects will be set forth in the detailed description which follows, and, in part, will be apparent from the disclosure, or may be learned by practice of the inventive concept.

According to exemplary embodiments, a liquid crystal display includes a first substrate, a gate line disposed on the first substrate, a data line disposed on the first substrate, a first passivation layer disposed on the gate line and the data line, a color filter disposed on the first passivation layer, a common electrode disposed on the color filter, a light blocking member disposed directly on or directly below the common electrode, a second passivation layer disposed on the common electrode and the light blocking member, and a pixel electrode disposed on the second passivation layer.

According to exemplary embodiments, a liquid crystal display includes a first substrate, a gate line disposed on the first substrate, a data line disposed on the first substrate, a first passivation layer disposed on the gate line and the data line, a color filter disposed on the first passivation layer, a common electrode disposed on the color filter, a second passivation layer disposed on the common electrode, the second passivation layer including an opening, a pixel electrode disposed on the second passivation layer, and a light blocking member disposed on the second passivation layer. The light blocking member is connected to the common electrode through the opening in the second passivation layer.

According to exemplary embodiments, a liquid crystal display includes a first substrate, a gate line disposed on the first substrate, a data line disposed on the first substrate, a first passivation layer disposed on the gate line and the data line, a color filter disposed on the first passivation layer, a pixel electrode disposed on the first passivation layer, a second passivation layer disposed on the pixel electrode, a common electrode disposed on the second passivation layer, and a light blocking member disposed directly on or directly below the common electrode.

According to exemplary embodiments, a liquid crystal display includes a substrate, a gate line disposed on the substrate, a data line disposed on the substrate, a first passivation layer disposed on the gate line and the data line, a first electrode disposed on the first passivation layer, a second passivation layer disposed on the first electrode, a second electrode disposed on the second passivation layer, the second electrode including a plurality of cutouts, and a blocking layer disposed on the second electrode. The blocking layer covers a first edge of the cutouts of the second electrode, the first edges extending substantially parallel to the gate line among edges of the cutouts of the second electrode.

According to exemplary embodiments, two field generating electrodes and a light blocking member may be formed on the same substrate so that the deterioration of light transmittance due to misalignment between two substrates may be prevented (or otherwise reduced). In this manner, a parasitic capacitance which may otherwise occur between the light blocking member and the pixel electrode may also be prevented (or otherwise reduced). This may prevent the display quality from being deteriorated.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain the principles of the inventive concept.

DETAILED DESCRIPTION OF THE ILLUSTRATIVE EMBODIMENTS

Figure 1:
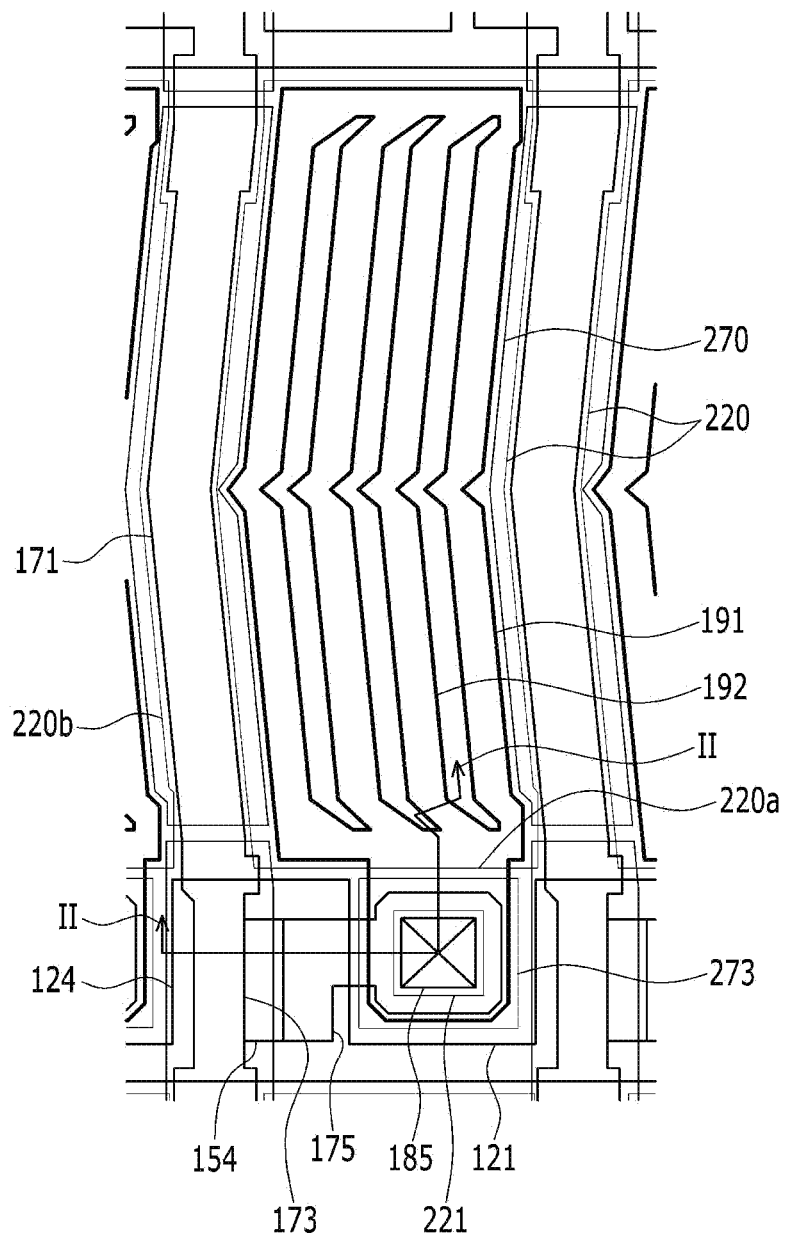
FIG. 1 is a layout view of a liquid crystal display, according to exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
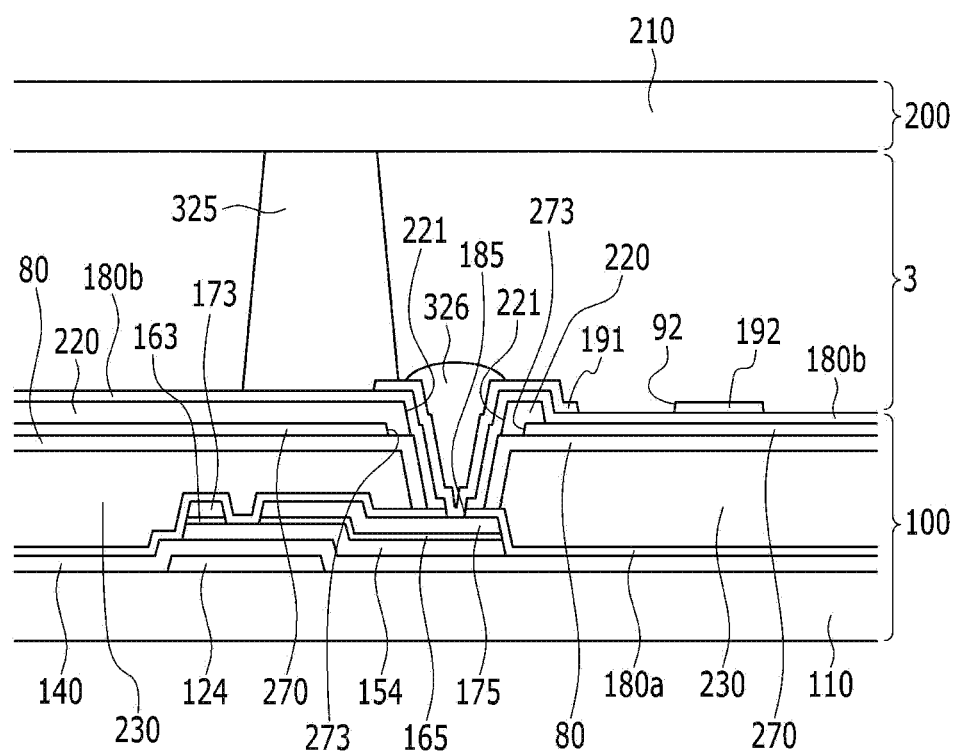
FIG. 2 is a cross-sectional view of the liquid crystal display of FIG. 1 taken along sectional line II-II, according to exemplary embodiments.

FIG. 1 is a layout view of a liquid crystal display, according to exemplary embodiments. FIG. 2 is a cross-sectional view of the liquid crystal display of FIG. 1 taken along sectional line II-II.

Referring to FIG. 1 and FIG. 2, the liquid crystal display includes a lower panel 100 including a first substrate 110, and an upper panel 200 including a second substrate 210. The first substrate 110 and the second substrate 210 face each other. A liquid crystal layer 3 is disposed between the lower panel 100 and the upper panel 200.

A gate conductor including a gate line 121 is formed on the first substrate 110, which may be formed of any suitable material, such as, for example, transparent glass, plastic, etc. The gate line 121 may include a wide end portion (not illustrated) connected with a gate electrode 124 and other layers or an external driving circuit. The gate line 121 may be formed of any suitable conductive material, such as, for instance, an aluminum based metal, e.g., aluminum (Al) or an aluminum alloy, a silver based metal, e.g., silver (Ag) or a silver alloy, a copper based metal, e.g., copper (Cu) or a copper alloy, a molybdenum based metal, e.g., molybdenum (Mo) or a molybdenum alloy, a chromium based metal, e.g., chromium (Cr) or a chromium alloy, a tantalum based metal, e.g., tantalum (Ta) or a tantalum alloy, a titanium based metal, e.g., titanium (Ti) or a titanium alloy, etc. The gate line 121 may have a single layer or a multilayer structure, which may include at least two conductive layers of different physical properties.

According to exemplary embodiments, a gate insulating layer 140 may be formed of any suitable material, such as, for example, silicon nitride (SiNx), silicon oxide (SiOx), etc., is formed on the gate conductors 121 and 124. The gate insulating layer 140 may have a single layer or a multilayer structure, which may include at least two insulating layers of different physical properties.

A semiconductor 154 may be formed of any suitable material, e.g., amorphous silicon, polysilicon, etc., is formed on the gate insulating layer 140. It is also contemplated that the semiconductor 154 may include an oxide semiconductor. Ohmic contacts 163 and 165 are formed on the semiconductor 154. The ohmic contacts 163 and 165 may be formed of any suitable material, such as, for example, n+ hydrogenated amorphous silicon, in which an n type impurity, such as phosphorus, may be doped at a relatively high concentration, or silicide. The ohmic contacts 163 and 165 form a pair disposed on the semiconductor 154. If the semiconductor 154 is an oxide semiconductor, the ohmic contacts 163 and 165 may be omitted.

The liquid crystal display device may further include a data conductor including a data line 171. The data line 171 includes a source electrode 173 and a drain electrode 175, which are respectively formed on the ohmic contacts 163 and 165 and the gate insulating layer 140. The data line 171 includes a wide end portion (not illustrated) connected with another layer or an external driving circuit. The data line 171 transmits a data signal and mainly extends in a first (e.g., vertical) direction intersecting the gate line 121 mainly extending in a second (e.g., horizontal) direction. The data line 171 may have a first curved portion, which has a bent shape, in order to obtain maximum (or at least increased) transmittance of the liquid crystal display. The data line 171 further includes a second curved portion that is bent to form a determined angle with the first curved portion in a center region of the pixel area. That is, the first and second curved portions may meet at a center region of the pixel area to form a V shape. For example, the first curved portion of the data line 171 may be bent at approximately 7° with respect to a vertical reference line perpendicular to a direction in which the gate line 121 mainly extends. The second curved portion, which is disposed at the center region of the pixel area, may be further bent to form approximately 7° to 15° with respect to the first curved portion.

The source electrode 173 is a part of the data line 171 and is disposed on the same layer as the data line 171. The drain electrode 175 extends parallel to the source electrode 173. Therefore, the drain electrode 175 is at least parallel to part of the data line 171.

The gate electrode 124, the source electrode 173, and the drain electrode 175 form a thin film transistor (TFT) together with the semiconductor 154. A channel of the thin film transistor is formed in the semiconductor 154 between the source electrode 173 and the drain electrode 175.

According to exemplary embodiments, the source electrode 173, which is disposed on the same layer as the data line 171, and the drain electrode 175, which extends parallel to the data line 171, are formed such that a width of the thin film transistor is increased without increasing an area of the data conductor. In this manner, the aperture ratio of the liquid crystal display may be increased.

The data line 171, the source electrode 173, and the drain electrode 175 may be formed of any suitable material, such as, for example, a refractory metal, e.g., molybdenum, chromium, tantalum, titanium, etc., or an alloy thereof. It is also noted that the data line 171, the source electrode 173, and the drain electrode 175 may have a single layer or a multilayer structure (not shown), which may include one or more of the aforementioned refractory metals and a low resistance conductive layer (not illustrated). An example of the multilayer structure may include a double layer of a chromium or molybdenum (or alloys thereof) lower layer and an aluminum (or an alloy thereof) upper layer or a triple layer of the molybdenum (or an alloy thereof) lower layer, an aluminum (or an alloy thereof) intermediate layer, and a molybdenum (or an alloy thereof) upper layer. It is contemplated, however, that the data line 171, the source electrode 173, and the drain electrode 175 may be formed of other various metals or conductors.

A first passivation layer 180a is formed on exposed portions of the data conductors 171, 173, and 175, the gate insulating layer 140, and the semiconductor 154. The first passivation layer 180a may be formed of any suitable material, e.g., an organic insulating material, an inorganic insulating material, etc.

A color filter 230 is formed on the first passivation layer 180a. The color filter 230 may enable the unique display of one of the primary colors, such as, for example, red, green, and blue, or yellow, cyan, and magenta. It is contemplated, however, that any suitable color may be utilized in association with the color filter 230. Even though not illustrated, the color filter 230 may further include other color filters to display a mixed color of the primary colors or white in addition to the primary colors.

An overcoat 80 is disposed on the color filter 230. The overcoat 80 may be omitted. The overcoat 80 may prevent a pigment of the color filter 230 from flowing into (or otherwise contaminating) the liquid crystal layer 3. The overcoat 80 may be formed of any suitable material, e.g., an inorganic insulating material, an organic insulating material, etc.

A common electrode 270 is formed on the overcoat 80. The common electrode 270 has a planar shape formed on the entire (or substantially entire) surface of the substrate 110 as a whole plate. That is, the common electrode 270 may have a planar shape in plan view. The common electrode 270 has a first opening 273, which is formed in a region corresponding to the periphery of the drain electrode 175. The common electrodes 270 that are disposed in adjacent pixels are connected to each other so that a common voltage having a determined amplitude supplied from a source, e.g., an external source outside of the display area, may be transmitted to the common electrodes 270.

A light blocking member 220 is formed directly on the common electrode 270. The light blocking member 220 includes a first light blocking member 220a formed along a direction in which the gate line 121 extends and overlaps the gate line 121 and the thin film transistor and a second light blocking member 220b formed along a direction in which the data line 171 extends and overlaps the data line 171. The first light blocking member 220a and the second light blocking member 220b are connected to each other. The first light blocking member 220a has a second opening 221 formed in a region overlapping a part of the drain electrode 175. Even though it has been described that the light blocking member 220 includes the first light blocking member 220a formed along a direction where the gate line 121 extends and the second light blocking member 220b formed along a direction in which the data line 171 extends, it is also contemplated that the second light blocking member 220b formed along the direction in which the data line 171 extends may be omitted.

According to exemplary embodiments, the light blocking member 220 is disposed directly on the common electrode 270, and the light blocking member 220 and the common electrode 270 are physically and electrically connected to each other. To this end, it is noted that a portion of the light blocking member 220 covers the walls of the first opening 273 in the common electrode 270. Therefore, even when a permittivity of the light blocking member 220 is high, such that a voltage is well transmitted, an electric potential of the light blocking member 220 may be equal to that of the common electrode 270. The light blocking member is removed from a region corresponding to a periphery of the color filter 230 and the drain electrode 175.

A second passivation layer 180b is formed on the light blocking member 220. The second passivation layer 180b may be formed of any suitable material, such as, for example, an organic insulating material, an inorganic insulating material, etc. A pixel electrode 191 is formed on the second passivation layer 180b. The pixel electrode 191 includes a curved edge that is substantially parallel to the first curved portion and the second curved portion of the data line 171. The pixel electrode 191 includes a plurality of cutouts 92 and a plurality of first branch electrodes 192 defined by the plurality of cutouts 92.

A first contact hole 185 is formed in the first passivation layer 180a and the second passivation layer 180b to expose the drain electrode 175. The pixel electrode 191 is physically and electrically connected to the drain electrode 175 through the first contact hole 185. In this manner, the pixel electrode 191 may be provided with a voltage from the drain electrode 175.

As described above, the common electrode 270 has a first opening 273 formed in a region corresponding to a periphery of the drain electrode 175 and the light blocking member 220 has a second opening 221 formed in a region overlapping a part of the drain electrode 175. The first contact hole 185, which connects the pixel electrode 191 with the drain electrode 175, is formed in a position where the first opening 273 of the common electrode 270 and the second opening 221 of the light blocking member 220 are formed.

Although not illustrated, an alignment layer may be formed on the pixel electrode 191 and the second passivation layer 180b. The alignment layer may be a horizontal alignment layer and rubbed in a determined direction. It is also contemplated that the alignment layer may include a photo reaction material that may be optically aligned.

A spacer 325 is disposed between the first substrate 110 and the second substrate 210. The spacer 325 maintains a gap between the first substrate 110 and the second substrate 210, which face each other.

A coloring member 326 is formed in a position corresponding to the first contact hole 185. That is, the coloring member 326 may be at least partially disposed in the first contact hole 185. The coloring member 326 is formed to cover the second opening 221 of the light blocking member 220 and to prevent the light leakage around the second opening 221 of the light blocking member 220. The coloring member 326 is disposed around (or to cover) the first contact hole 185 to prevent light leakage around the first contact hole 185 and to compensate for a step formed by the first contact hole 185. It is noted that the spacer 325 and the coloring member 326 may be formed of the same material.

The liquid crystal layer 3 is disposed between the first substrate 110 and the second substrate 210. The liquid crystal layer 3 may include a nematic liquid crystal material having a positive dielectric anisotropy. It is contemplated, however, that any other or additional types of liquid crystal may be utilized in association with exemplary embodiments described herein. Liquid crystal molecules of the liquid crystal layer 3 are arranged such that a major axis thereof is disposed parallel to the substrates 110 and 210. Any other suitable arrangement may also be utilized in association with exemplary embodiments described herein.

According to exemplary embodiments, the pixel electrode 191 is applied with a data voltage from the drain electrode 175 and the common electrode 270 is applied with a common voltage with a determined amplitude from a common voltage applying unit, which may be disposed outside the display area. The pixel electrode 191 and the common electrode 270 (which are field generating electrodes) generate an electric field to rotate (or otherwise align or control the alignment of) the liquid crystal molecules of the liquid crystal layer 3 disposed on the two electrodes 191 and 270 in a direction parallel to a direction of the electric field.

Polarization of light propagating through the liquid crystal layer 3 may be varied depending on the rotational direction (or alignment) of the liquid crystal molecules.

As described above, the pixel electrode 191 and the common electrode 270 are formed on the first substrate 110 and the color filter 230 and the light blocking member 220 are also formed on the first substrate 110. Therefore, it is possible to prevent the light leakage or the deterioration of an aperture ratio that might otherwise occur as a result of a misalignment between the first substrate 110 and the second substrate 210. Further, the light blocking member 220 is formed directly on the common electrode 270, such that the light blocking member 220 is in contact with the common electrode 270. Therefore, even when the light blocking member 220 is formed of a material having a high permittivity so that voltage is well transmitted thereto, the potential of the light blocking member 220 may be equal to that of the common electrode 270. To this end, even though the light blocking member 220 and the pixel electrode 191 overlap each other with the second insulating layer 180b disposed therebetween, it is possible to prevent (or otherwise reduce) unnecessary parasitic capacitance from occurring. As such, deterioration of display quality that might otherwise occur in association with the formation of a parasitic capacitance may be prevented (or otherwise reduced).

According to exemplary embodiments, since the light blocking member 220 is formed directly in contact with the common electrode 270 (and, thereby, has an equal potential as the common electrode 270), it is possible to prevent (or otherwise reduce) a parasitic capacitance from occurring between the field generating electrodes, such as the pixel electrode 191 and the common electrode 270, and the light blocking member 220 without forming the light blocking member 220 using a relatively expensive material having a low permittivity.

Figure 3:
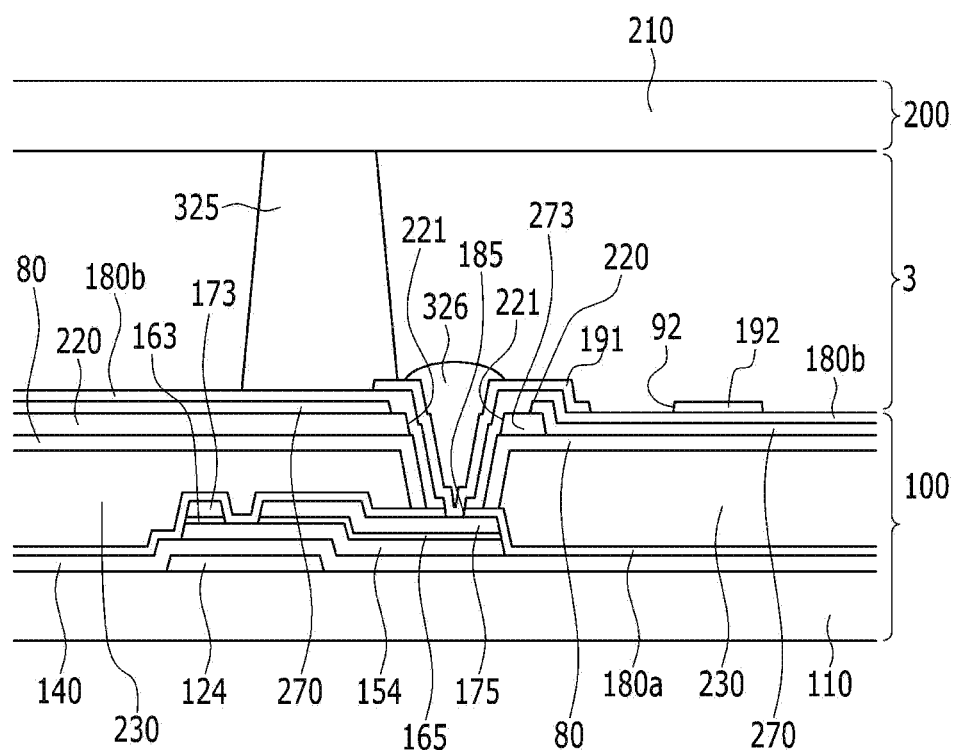
FIG. 3 is an alternative cross-sectional view of the liquid crystal display of FIG. 1 taken along sectional line II-II, according to exemplary embodiments.

With continued reference to FIG. 1, FIG. 3 is an alternative cross-sectional view of the liquid crystal display of FIG. 1 taken along sectional line II-II, according to exemplary embodiments. Referring to FIG. 3, the illustrated liquid crystal display is substantially similar to the liquid crystal display depicted in FIG. 1 and FIG. 2. To avoid obscuring exemplary embodiments described herein, duplicative descriptions will be omitted.

Referring to FIG. 3, the liquid crystal display includes a lower panel 100 including a first substrate 110 and an upper panel 200 including a second substrate 210 facing the first substrate 110. A liquid crystal layer 3 is disposed between the lower panel 100 and the upper panel 200.

A gate conductor including a gate line 121 is formed on the first substrate 110. The gate line 121 includes a gate electrode 124. A gate insulating layer 140 is formed on the gate electrode 124 and the first substrate 110. A semiconductor 154 is formed on the gate insulating layer 140 and ohmic contacts 163 and 165 are formed on the semiconductor 154. If the semiconductor 154 is an oxide semiconductor, the ohmic contacts 163 and 165 may be omitted.

According to exemplary embodiments, the data line 171 including a source electrode 173 and a data conductor including the drain electrode 175 are formed on the ohmic contacts 163 and 165 and the gate insulating layer 140. The source electrode 173 is part of the data line 171 and is disposed on the same layer as the data line 171. The drain electrode 175 extends parallel to the source electrode 173. Therefore, the drain electrode 175 is parallel to at least part of the data line 171.

A first passivation layer 180a is formed on exposed portions of the data conductors 171, 173, and 175, the gate insulating layer 140, and the semiconductor 154. The first passivation layer 180a may be formed of any suitable material, such as, for example, an organic insulating material, an inorganic insulating material, etc.

A color filter 230 is formed on the first passivation layer 180a. An overcoat 80 is disposed on the color filter 230. The overcoat 80 may be omitted. The overcoat 80 may prevent a pigment of the color filter 230 from flowing into (or otherwise contaminating) the liquid crystal layer 3. The overcoat 80 may be formed of any suitable material, such as, for example, an inorganic insulating material, an organic insulating material, etc.

A light blocking member 220 is formed on the overcoat 80. The light blocking member 220 includes a first light blocking member 220a, which is formed along a direction in which the gate line 121 extends and overlaps the gate line 121 and the thin film transistor, and a second light blocking member 220b, which is formed along a direction in which the data line 171 extends and overlaps the data line 171. The first light blocking member 220a and the second light blocking member 220b are connected to each other. The first light blocking member 220a has a second opening 221 formed in a region overlapping part of the drain electrode 175. Even though it has been described that the light blocking member 220 includes the first light blocking member 220a formed along a direction where the gate line 121 extends and the second light blocking member 220b formed along a direction in which the data line 171 extends, it is contemplated that the second light blocking member 220b may be omitted.

A common electrode 270 is formed directly on the light blocking member 220. The common electrode 270 has a planar shape formed on the entire (or substantially entire) surface of the substrate 110 as a whole plate. The common electrode 270 includes a first opening 273, which is formed in a region corresponding to the periphery of the drain electrode 175. The common electrodes 270, which are disposed in adjacent pixels, are connected to each other so that a common voltage having a determined amplitude supplied from a source may be transmitted to the common electrodes 270.

The light blocking member 220 is disposed directly on the common electrode 270, and the light blocking member 220 and the common electrode 270 are physically and electrically connected to each other. Therefore, even when a permittivity of the light blocking member 220 is high so that a voltage is well transmitted, an electric potential of the light blocking member 220 may be equal to that of the common electrode 270.

According to exemplary embodiments, the color filter 230 is removed from a region corresponding to a periphery of the drain electrode 175. A second passivation layer 180b is formed on the common electrode 270. The second passivation layer 180b may be formed of any suitable material, such as, for example, an organic insulating material, an inorganic insulating material, etc.

A pixel electrode 191 is formed on the second passivation layer 180b. A first contact hole 185 is formed in the first passivation layer 180a and the second passivation layer 180b to expose the drain electrode 175. The pixel electrode 191 is physically and electrically connected to the drain electrode 175 through the first contact hole 185. In this manner, the pixel electrode 191 may be provided with a voltage from the drain electrode 175.

As seen in FIG. 3, the common electrode 270 has a first opening 273 formed in a region corresponding to a periphery of the drain electrode 175 and the light blocking member 220 has a second opening 221 formed in a region overlapping a part of the drain electrode 175. Alternative to the configuration described in association with FIG. 2, the light blocking member 220 is disposed between color filter 230 and the common electrode 270. To this end, the common electrode 270 does not cover the walls of the second opening 221 in the light blocking member 220. Further, the light blocking member 220 does not cover the walls of the first opening in the common electrode 270. The first contact hole 185 which connects the pixel electrode 191 with the drain electrode 175 is formed in a position where the first opening 273 of the common electrode 270 and the second opening 221 of the light blocking member 220 are formed.

Although not illustrated, an alignment layer may be formed on the pixel electrode 191 and the second passivation layer 180b. The alignment layer may be a horizontal alignment layer and rubbed in a determined direction. It is also contemplated that the alignment layer may include a photo reaction material that is optically aligned.

A spacer 325 is disposed between the first substrate 110 and the second substrate 210. The spacer 325 maintains a gap between the first substrate 110 and the second substrate 210 which face each other. The coloring member 326 is formed in a position corresponding to the first contact hole 185. The coloring member 326 is formed to cover the second opening 221 of the light blocking member 220 and to prevent (or reduce) the light leakage around the second opening 221 of the light blocking member 220. The coloring member 326 is disposed around (or at least partially in) the first contact hole 185 to prevent (or reduce) light leakage around the first contact hole 185. In this manner, the coloring member 326 may compensate for a step formed by the first contact hole 185. To this end, it is noted that the spacer 325 and the coloring member 326 may be formed of the same material.

The liquid crystal layer 3 is disposed between the first substrate 110 and the second substrate 210. The liquid crystal layer 3 may include a nematic liquid crystal material having a positive dielectric anisotropy. It is contemplated, however, that any other suitable type of liquid crystal may be utilized in association with exemplary embodiments described herein.

According to exemplary embodiments, the pixel electrode 191 may be applied with a data voltage from the drain electrode 175 and the common electrode 270 may be applied with a common voltage with a determined amplitude from a common voltage applying unit, which may be disposed outside the display area. The pixel electrode 191 and the common electrode 270, which are field generating electrodes, generate an electric field to rotate (or otherwise control the alignment of) the liquid crystal molecules of the liquid crystal layer 3 disposed on the two electrodes 191 and 270 in a direction parallel to a direction of the electric field. Polarization of the light passing through the liquid crystal layer 3 may be varied depending on the rotational (or alignment) direction of the liquid crystal molecules.

According to exemplary embodiments, the pixel electrode 191 and the common electrode 270 are formed on the first substrate 110 and the color filter 230 and the light blocking member 220 are also formed on the first substrate 110. Therefore, it is possible to prevent (or reduce) light leakage or deterioration of an aperture ratio that might otherwise occur as a result of a misalignment between the first substrate 110 and the second substrate 210. Further, the light blocking member 220 is formed directly below the common electrode 270, such that the light blocking member 220 is in contact with the common electrode 270. Therefore, even when the light blocking member 220 is formed of a material having a high permittivity so that the voltage is well transmitted thereto, the electrical potential of the light blocking member 220 may be equal to that of the common electrode 270. As such, even though the light blocking member 220 and the pixel electrode 191 overlap each other with the second insulating layer 180b disposed therebetween, it is possible to prevent (or reduce) parasitic capacitance from occurring. In this manner, deterioration of the display quality that might otherwise occur in association with the formation of a parasitic capacitance may be prevented (or reduced).

In exemplary embodiments, since the light blocking member 220 is formed to be directly in contact with the common electrode 270 to have equal electric potential, it is possible to prevent (or reduce) parasitic capacitance from occurring between the field generating electrodes, such as the pixel electrode 191 and the common electrode 270, and the light blocking member 220 without forming the light blocking member 220 using a relatively expensive material having a low permittivity.

Figure 4:
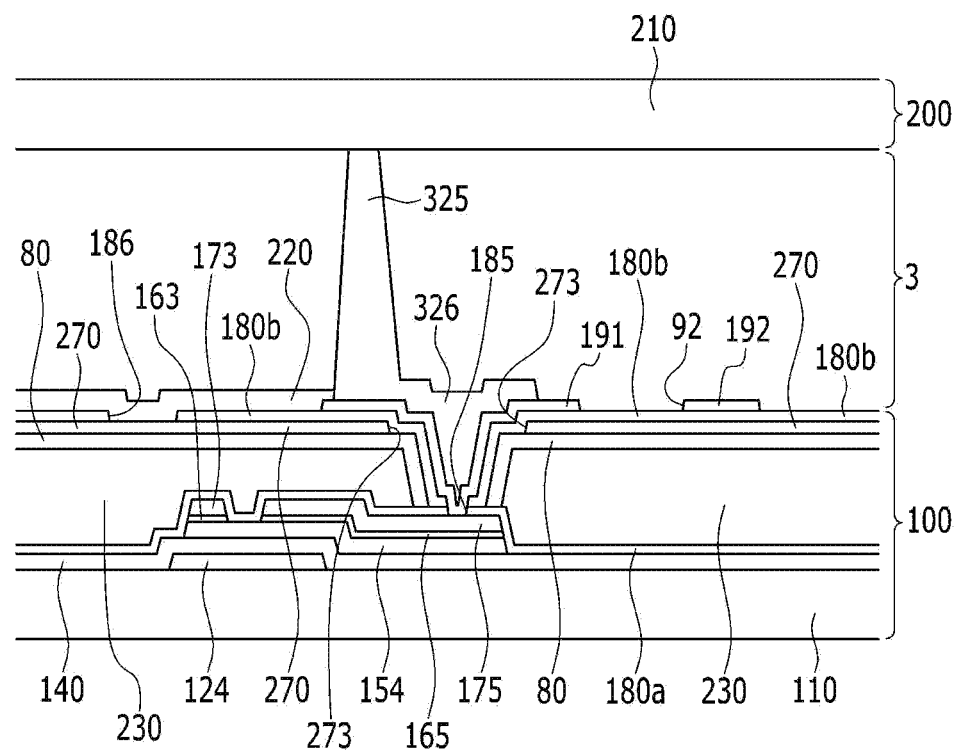
FIG. 4 is an alternative cross-sectional view of the liquid crystal display of FIG. 1 taken along sectional line II-II, according to exemplary embodiments.

With continued reference to FIG. 1, FIG. 4 is an alternative cross-sectional view of the liquid crystal display of FIG. 1 taken along sectional line II-II, according to exemplary embodiments. Referring to FIG. 4, the illustrated liquid crystal display is substantially similar to the liquid crystal display depicted in FIG. 1 and FIG. 2. To avoid obscuring exemplary embodiments described herein, duplicative descriptions will be omitted.

Referring to FIG. 4, the liquid crystal display includes a lower panel 100 including a first substrate 110 and an upper panel 200 including a second substrate 210 facing the first substrate 110. A liquid crystal layer 3 is disposed between the lower panel 100 and the upper panel 200.

A gate conductor including a gate line 121 is formed on the first substrate 110. The gate line 121 includes a gate electrode 124. A gate insulating layer 140 is formed on the gate electrode 124 and the first substrate 110. A semiconductor 154 is formed on the gate insulating layer 140 and ohmic contacts 163 and 165 are formed on the semiconductor 154. If the semiconductor 154 is an oxide semiconductor, the ohmic contacts 163 and 165 may be omitted.

According to exemplary embodiments, the data line 171 including a source electrode 173 and a data conductor including the drain electrode 175 are formed on the ohmic contacts 163 and 165 and the gate insulating layer 140. The source electrode 173 is part of the data line 171 and is disposed on the same layer as the data line 171. The drain electrode 175 extends parallel to the source electrode 173. Therefore, the drain electrode 175 is parallel to at least part of the data line 171.

A first passivation layer 180a is formed on exposed portions of the data conductors 171, 173, and 175, the gate insulating layer 140, and the semiconductor 154. A color filter 230 is formed on the first passivation layer 180a. An overcoat 80 is disposed on the color filter 230. The overcoat 80 may be omitted. The overcoat 80 may prevent a pigment of the color filter 230 from flowing into (or otherwise contaminating) the liquid crystal layer 3.

A common electrode 270 is formed on the overcoat 80. The common electrode 270 has a planar shape formed on the entire (or substantially entire) surface of the first substrate 110 as a whole plate. The common electrode 270 includes a first opening 273, which is formed in a region corresponding to the periphery of the drain electrode 175. A second passivation layer 180b is formed on the common electrode 270. The second passivation layer 180b may be formed of any suitable material, such as, for example, an organic insulating material, an inorganic insulating material, etc. A pixel electrode 191 is formed on the second passivation layer 180b.

According to exemplary embodiments, a first contact hole 185 is formed in the first passivation layer 180a and the second passivation layer 180b to expose the drain electrode 175. The pixel electrode 191 is physically and electrically connected to the drain electrode 175 through the first contact hole 185. In this manner, the pixel electrode 191 may be provided with a voltage from the drain electrode 175.

A light blocking member 220 is formed on the second passivation layer 180b. The light blocking member 220 is spaced apart from the pixel electrode 191. The light blocking member 220 includes a first light blocking member 220a, which is formed along a direction in which the gate line 121 extends and overlaps the gate line 121 and the thin film transistor, and a second light blocking member 220b, which is formed along a direction in which the data line 171 extends and overlaps the data line 171. The first light blocking member 220a and the second light blocking member 220b are connected to each other. Even though it has been described that the light blocking member 220 includes the first light blocking member 220a formed along a direction where the gate line 121 extends and the second light blocking member 220b formed along a direction in which the data line 171 extends, it is contemplated that the second light blocking member 220b may be omitted.

A second contact hole 186 is formed in the second passivation layer 180b to expose a part of the common electrode 270. The light blocking member 220 is physically and electrically connected to the common electrode 270 through the second contact hole 186 formed in the second passivation layer 180b. Therefore, even when a permittivity of the light blocking member 220 is high so that a voltage is well transmitted, a potential of the light blocking member 220 may be equal to that of the common electrode 270.

Although not illustrated, an alignment layer may be formed on the pixel electrode 191 and the second passivation layer 180b. The alignment layer may be a horizontal alignment layer and rubbed in a determined direction. It is also contemplated that the alignment layer may include a photo reaction material that is optically aligned.

As seen in FIG. 4, a spacer 325 is disposed between the first substrate 110 and the second substrate 210. The spacer 325 maintains a gap between the first substrate 110 and the second substrate 210 which face each other. The coloring member 326 is formed in a position corresponding to the first contact hole 185 and extends from the spacer 325. In other words, the coloring member 326 and the spacer 325 may be a single component with dual purposes. The coloring member 326 is disposed around (or at least partially in) the first contact hole 185 to prevent (or reduce) light leakage around the first contact hole 185 and to compensate for a step formed by the first contact hole 185.

The spacer 325 and the coloring member 326 may be formed of the same material. Differently from the liquid crystal display of FIGS. 2 and 3, the light blocking member 220 may be formed in the same layer as the spacer 325 and the coloring member 326. Further, the light blocking member 220 may be formed on the pixel electrode 191, which is connected to the drain electrode 175 through the first contact hole 185. Therefore, the light blocking member 220 does not have the second opening 221, which was disposed in a region where the first contact hole 185 is formed in the liquid crystal display of FIGS. 2 and 3.

The liquid crystal layer 3 is disposed between the first substrate 110 and the second substrate 210. The liquid crystal layer 3 includes a nematic liquid crystal material having a positive dielectric anisotropy. It is contemplated, however, that any other suitable type of liquid crystal may be utilized in association with exemplary embodiments described herein.

The pixel electrode 191 is applied with a data voltage from the drain electrode 175 and the common electrode 270 is applied with a common voltage with a determined amplitude from a common voltage applying unit, which may be disposed outside the display area. The pixel electrode 191 and the common electrode 270, which are field generating electrodes, generate an electric field to rotate (or otherwise control the alignment of) the liquid crystal molecules of the liquid crystal layer 3 disposed on the two electrodes 191 and 270 in a direction parallel to a direction of the electric field. Polarization of light passing through the liquid crystal layer 3 is varied depending on the rotational (or alignment) direction of the liquid crystal molecules.

According to exemplary embodiments, the pixel electrode 191 and the common electrode 270 are formed on the first substrate 110 and the color filter 230 and the light blocking member 220 are also formed on the first substrate 110. Therefore, it is possible to prevent (or reduce) the light leakage or the deterioration of an aperture ratio that might otherwise occur as a result of a misalignment between the first substrate 110 and the second substrate 210. Further, the light blocking member 220, which is formed on the second passivation layer 180b, is physically and electrically connected with the common electrode 270 through the second contact hole 186. Therefore, even when the light blocking member 220 is formed of a material having a high permittivity so that the voltage is well transmitted thereto, the electrical potential of the light blocking member 220 may be equal to that of the common electrode 270. Therefore, even though the light blocking member 220 and the pixel electrode 191 overlap each other with the second insulating layer 180b disposed therebetween, it is possible to prevent (or reduce) parasitic capacitance from occurring. In this manner, deterioration of display quality that might otherwise occur in association with the formation of a parasitic capacitance may be prevented (or reduced).

In exemplary embodiments, since the light blocking member 220 is formed to be directly in contact with the common electrode 270 to have equal electric potential, it is possible to prevent (or reduce) parasitic capacitance from occurring between the field generating electrodes, such as the pixel electrode 191 and the common electrode 270, and the light blocking member 220 without forming the light blocking member 220 using a relatively expensive material having a low permittivity.

Figure 5:
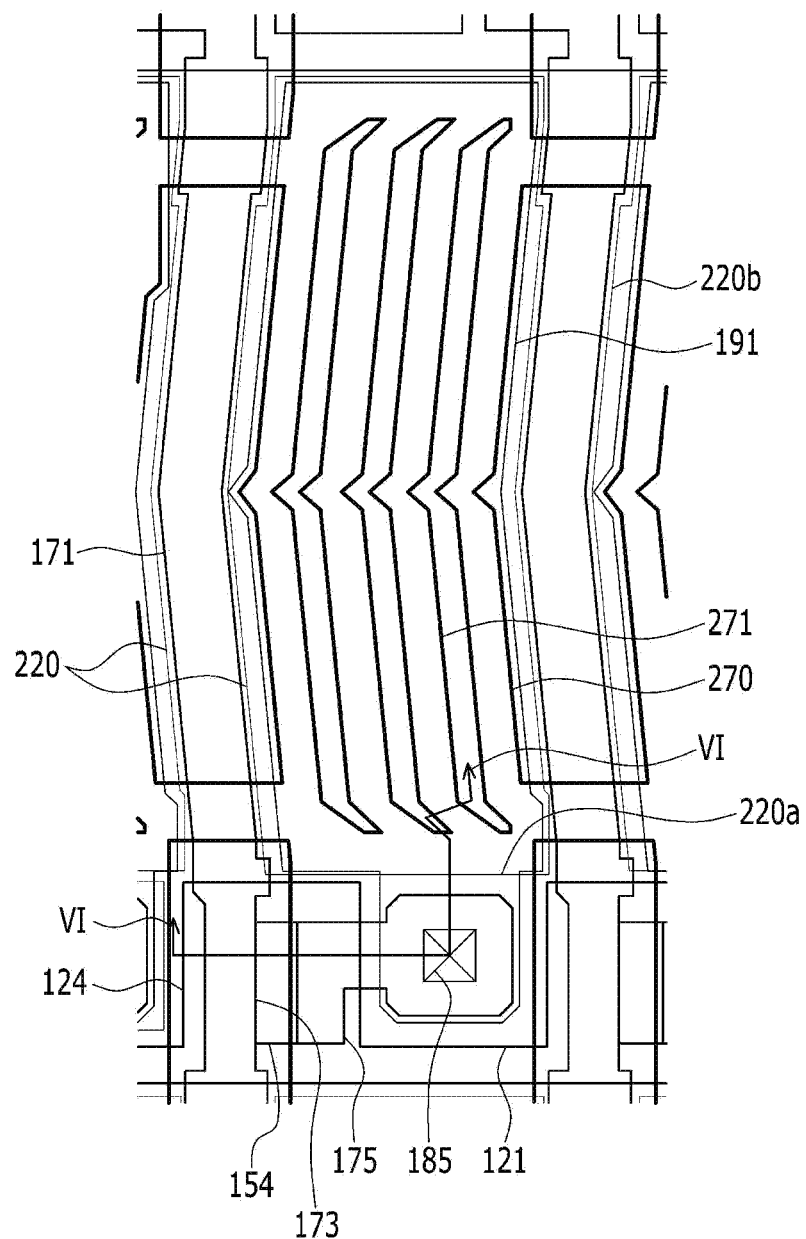
FIG. 5 is a layout view of a liquid crystal display, according to exemplary embodiments.
Figure 6:
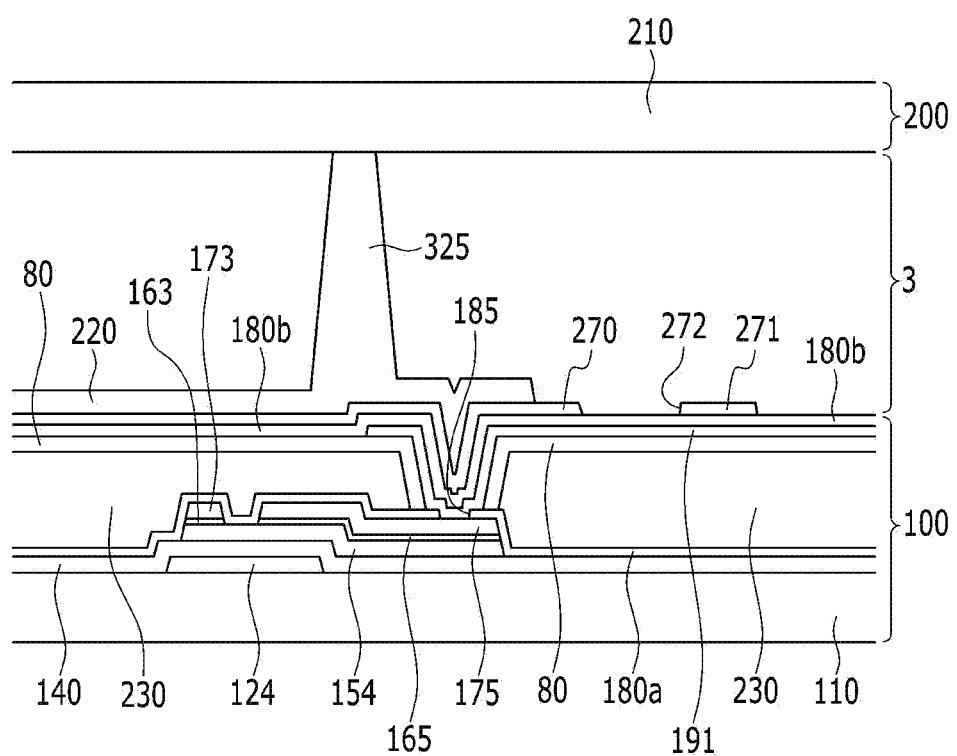
FIG. 6 is a cross-sectional view of the liquid crystal display of FIG. 5 taken along sectional line VI-VI, according to exemplary embodiments.

FIG. 5 is a layout view of a liquid crystal display, according to exemplary embodiments. FIG. 6 is a cross-sectional view of the liquid crystal display of FIG. 5 taken along sectional line VI-VI, according to exemplary embodiments.

Referring to FIG. 5 and FIG. 6, the liquid crystal display includes a lower panel 100 including a first substrate 110 and an upper panel 200 including a second substrate 210 facing the first substrate 110. A liquid crystal layer 3 is disposed between the lower panel 100 and the upper panel 200.

A gate conductor including a gate line 121 is formed on the first substrate 110, which may be formed of any suitable material, such as, for example, transparent glass, plastic, etc. The gate line 121 may include a wide end portion (not illustrated) connected with a gate electrode 124 and other layers or an external driving circuit. The gate line 121 may be formed of any suitable conductive material, such as, for example, an aluminum based metal, e.g., aluminum (Al) or an aluminum alloy, a silver based metal, e.g., silver (Ag) or a silver alloy, a copper based metal, e.g., copper (Cu) or a copper alloy, a molybdenum based metal, e.g., molybdenum (Mo) or a molybdenum alloy, a chromium based metal, e.g., chromium (Cr) or a chromium alloy, a tantalum based metal, e.g., tantalum (Ta) or a tantalum alloy, a titanium based metal, e.g., titanium (Ti) or a titanium alloy, etc. The gate line 121 may have a single layer or a multilayer structure, which may include at least two conductive layers of different physical properties.

According to exemplary embodiments, a gate insulating layer 140 may be formed of any suitable material, such as, for example, silicon nitride (SiNx), silicon oxide (SiOx), etc., is formed on the gate conductors 121 and 124. The gate insulating layer 140 may have a single or a multilayer structure, which may include at least two insulating layers of different physical properties.

A semiconductor 154 may be formed of any suitable material, e.g., amorphous silicon, polysilicon, etc., is formed on the gate insulating layer 140. It is also contemplated that the semiconductor 154 may include an oxide semiconductor. Ohmic contacts 163 and 165 are formed on the semiconductor 154. The ohmic contacts 163 and 165 may be formed of any suitable material, such as, for example, n+ hydrogenated amorphous silicon, in which an n type impurity, such as phosphorus, may be doped at a relatively high concentration, or silicide. The ohmic contacts 163 and 165 form a pair disposed on the semiconductor 154. If the semiconductor 154 is an oxide semiconductor, the ohmic contacts 163 and 165 may be omitted.

The liquid crystal display device may further include a data line 171 including a source electrode 173 and a data conductor including a drain electrode 175 respectively formed on the ohmic contacts 163 and 165 and the gate insulating layer 140. The data line 171 includes a wide end portion (not illustrated) connected with another layer or an external driving circuit. The data line 171 transmits a data signal and mainly extends in a first (e.g., vertical) direction intersecting the gate line 121 mainly extending in a second direction (e.g., horizontal) direction. The data line 171 may have a first curved portion, which has a bent shape, in order to obtain maximum (or at least increased) transmittance of the liquid crystal display. The data line 171 further includes a second curved portion that is bent to form a determined angle with the first curved portion in a center region of the pixel area. That is, the first and second curved portions may meet at a center region of the pixel area to form a V shape. For instance, the first curved portion of the data line 171 may be bent at approximately 7° with respect to a vertical reference line perpendicular to a direction in which the gate line 121 mainly extends. The second curved portion, which is disposed at the center region of the pixel area, may be further bent to form approximately an angle of 7° to 15° with respect to the first curved portion.

The source electrode 173 is a part of the data line 171 and is disposed on the same layer as the data line 171. The drain electrode 175 extends parallel to the source electrode 173. Therefore, the drain electrode 175 is at least parallel to part of the data line 171.

The gate electrode 124, the source electrode 173, and the drain electrode 175 form a thin film transistor (TFT) together with the semiconductor 154. A channel of the thin film transistor is formed in the semiconductor 154 between the source electrode 173 and the drain electrode 175.

According to exemplary embodiments, the source electrode 173, which is formed on the same layer as the data line 171, and the drain electrode 175, which extends parallel to the data line 171, are formed such that a width of the thin film transistor is increased without increasing an area of the data conductor. In this manner, the aperture ratio of the liquid crystal display may be increased.

The data line 171, the source electrode 173, and the drain electrode 175 may be formed of any suitable material, such as, for example, a refractory metal, e.g., molybdenum, chromium, tantalum, titanium, etc., or an alloy thereof. It is also noted that the data line 171, the source electrode 173, and the drain electrode 175 may have a single layer or a multilayer structure (not shown), which may include a film of one or more of the aforementioned refractory metals and a low resistance conductive layer (not illustrated). An example of the multilayer structure may include a double layer of a chromium or molybdenum (or alloys thereof) lower layer and an aluminum (or an alloy thereof) upper layer or a triple layer of the molybdenum (or an alloy thereof) lower layer, an aluminum (or an alloy thereof) intermediate layer, and a molybdenum (or an alloy thereof) upper layer. It is contemplated, however, that the data line 171, the source electrode 173, and the drain electrode 175 may be formed of other various metals or conductors.

A first passivation layer 180a is disposed on exposed portions of the data conductors 171, 173, and 175, the gate insulating layer 140, and the semiconductor 154. The first passivation layer 180a may be formed of any suitable material, e.g., an organic insulating material, an inorganic insulating material, etc.

A color filter 230 is formed on the first passivation layer 180a. The color filter 230 may enable the unique display one of the primary colors, such as, for example, red, green, and blue, or yellow, cyan, and magenta. It is contemplated, however, that any suitable color may be utilized in association with the color filter 230. Even though not illustrated, the color filter 230 may further include other color filters to display a mixed color of the primary colors or white in addition to the primary colors.

An overcoat 80 is disposed on the color filter 230. The overcoat 80 may be omitted. The overcoat 80 may prevent a pigment of the color filter 230 from flowing into (or otherwise contaminating) the liquid crystal layer 3. The overcoat 80 may be formed of any suitable material, e.g., an inorganic insulating material, an organic insulating material, etc.

A pixel electrode 191 is formed on the overcoat 80. The pixel electrode 191 has a planar shape, that is, a plate shape, and is disposed in one pixel area. A first contact hole 185 is formed in the first passivation layer 180a to expose part of the drain electrode 175. The pixel electrode 191 is physically and electrically connected to the drain electrode 175 through the first contact hole 185. It is contemplated, however, that the pixel electrode 191 may be formed directly on the drain electrode 175 so as to directly contact the drain electrode 175.

As seen in FIG. 6, a second passivation layer 180b is formed on the pixel electrode 191 and the overcoat 80. The second passivation layer 180b may be formed of any suitable material, such as, for example, an organic insulating material, an inorganic insulating material, etc. The common electrode 270 is formed on the second passivation layer 180b. The common electrodes 270 of individual pixel areas are connected to each other to be applied with a reference common voltage from a common voltage applying unit, which may be disposed outside the display area.

According to exemplary embodiments, the common electrode 270 has a curved edge that is substantially parallel to the first curved portion and the second curved portion of the data line 171. The common electrodes 270 disposed in adjacent pixels are connected to each other. The common electrode 270 has a plurality of second cutouts 272 and a plurality of branch electrodes 271 defined by the plurality of second cutouts 272.

In exemplary embodiments, the light blocking member 220 is formed directly on the common electrode 270. The light blocking member 220 includes a first light blocking member 220a that is formed along a direction in which the gate line 121 extends and overlaps the gate line 121 and the thin film transistor and a second light blocking member 220b that is formed along a direction in which the data line 171 extends and overlaps the data line 171. The first light blocking member 220a and the second light blocking member 220b are connected to each other. Even though it has been described that the light blocking member 220 includes the first light blocking member 220a formed along a direction in which the gate line 121 extends and the second light blocking member 220b formed along a direction in which the data line 171 extends, it is also contemplated that the second light blocking member 220b may be omitted.

According to exemplary embodiments, the light blocking member 220 is disposed directly on the common electrode 270 and the light blocking member 220 and the common electrode 270 are physically and electrically connected to each other. Therefore, even when a permittivity of the light blocking member 220 is high so that a voltage is well transmitted, a potential of the light blocking member 220 may be equal to that of the common electrode 270. Although not illustrated, an alignment layer may be formed on the common electrode 270 and the second passivation layer 180b. The alignment layer may be a horizontal alignment layer and rubbed in a determined direction. It is also contemplated that the alignment layer may include a photo reaction material that is optically aligned.

A spacer 325 is disposed between the first substrate 110 and the second substrate 210. The spacer 325 maintains a gap between the first substrate 110 and the second substrate 210, which face each other. The spacer 325 may be formed in the same layer as the light blocking member 220. That is, the spacer 325 may extend from the light blocking member 220, and, thereby, constitute a single feature with multiple component parts. Although not illustrated, the liquid crystal display may further include a coloring member in a position corresponding to the first contact hole 185. The coloring member may be disposed at least partially in (or around) the first contact hole 185 to prevent (or reduce) light leakage around the first contact hole 185 and to compensate for a step formed by the first contact hole 185. The spacer 325 and the coloring member may be formed of the same material. It is contemplated that the coloring member may extend from the spacer 325. In this manner, the light blocking member 220, the spacer 325, and the coloring member may constitute component parts of a single feature.

As seen in FIG. 6, the liquid crystal layer 3 is disposed between the first substrate 110 and the second substrate 210. The liquid crystal layer 3 may include a nematic liquid crystal material having a positive dielectric anisotropy. It is also contemplated that any other suitable type of liquid crystal molecules may be utilized in association with exemplary embodiment described herein. The liquid crystal molecules of the liquid crystal layer 3 have a structure in that the major axis thereof is parallel to the display panels 100 and 200 and the direction of the liquid crystal molecules may be spirally twisted at 90° from the rubbing direction of the alignment layer of the first substrate 110 to the second substrate 210.

In exemplary embodiments, the pixel electrode 191 may be applied with a data voltage from the drain electrode 175 and the common electrode 270 may be applied with a common voltage with a determined amplitude from a common voltage applying unit, which may be disposed outside the display area. The pixel electrode 191 and the common electrode 270, which are field generating electrodes, generate an electric field to rotate (or otherwise align) the liquid crystal molecules of the liquid crystal layer 3 disposed on the two electrodes 191 and 270 in a direction parallel to a direction of the electric field. Polarization of light passing through the liquid crystal layer 3 may be varied depending on the rotational (or alignment) direction of the liquid crystal molecules.

As described above, the pixel electrode 191 and the common electrode 270 are formed on the first substrate 110 and the color filter 230 and the light blocking member 220 are also formed on the first substrate 110. As a result, light leakage or deterioration of the aperture ratio that might otherwise occur as a result of a misalignment between the first substrate 110 and the second substrate 210 may be prevented (or reduced). Further, the light blocking member 220 is formed directly on the common electrode 270 so that the light blocking member 220 is in contact with the common electrode 270. Therefore, even when the light blocking member 220 is formed of a material having a high permittivity so that the voltage is well transmitted thereto, the electric potential of the light blocking member 220 may be equal to that of the common electrode 270. Therefore, even though the light blocking member 220 and the pixel electrode 191 overlap each other with the second insulating layer 180b disposed therebetween, it is possible to prevent (or otherwise reduce) parasitic capacitance from occurring. In this manner, deterioration of the display quality that might otherwise occur as a result of a parasitic capacitance may be prevented (or otherwise reduced).

According to exemplary embodiments, since the light blocking member 220 is formed to be directly contact with the common electrode 270 to have an equal electrical potential, it is possible to prevent (or reduce) parasitic capacitance from occurring between the field generating electrodes, such as the pixel electrode 191 and the common electrode 270, and the light blocking member 220 without forming the light blocking member 220 using a relatively expensive material having a low permittivity.

Figure 7:
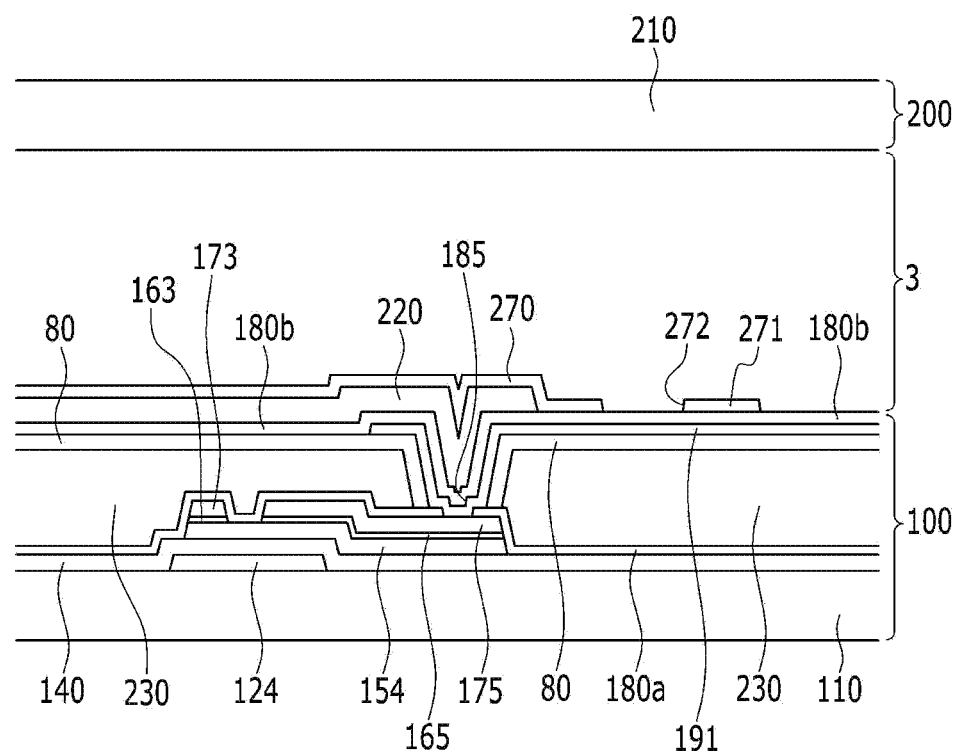
FIG. 7 is an alternative cross-sectional view of the liquid crystal display of FIG. 5 taken along sectional line VI-VI, according to exemplary embodiments.

With continued reference to FIG. 5, FIG. 7 is an alternative cross-sectional view of the liquid crystal display of FIG. 5 taken along sectional line VI-VI, according to exemplary embodiments. Referring to FIG. 7, the illustrated liquid crystal display is substantially similar to the liquid crystal display depicted in FIG. 5 and FIG. 6. To avoid obscuring exemplary embodiments described herein, duplicative descriptions will be omitted.

Referring to FIG. 7, the liquid crystal display includes a lower panel 100 including a first substrate 110 and an upper panel 200 including a second substrate 210 facing the first substrate 110. A liquid crystal layer 3 is disposed between the lower panel 100 and the upper panel 200.

A gate conductor including a gate line 121 is formed on the first substrate 110. The gate line 121 includes a gate electrode 124. A gate insulating layer 140 is formed on the gate electrode 124 and the first substrate 110. A semiconductor is formed on the gate insulating layer 140 and ohmic contacts 163 and 165 are formed on the semiconductor 154.

If the semiconductor 154 is an oxide semiconductor, the ohmic contacts 163 and 165 may be omitted.

According to exemplary embodiments, the data line 171 including a source electrode 173 and a data conductor including the drain electrode 175 are formed on the ohmic contacts 163 and 165 and the gate insulating layer 140. The source electrode 173 is part of the data line 171 and is disposed on the same layer as the data line 171. The drain electrode 175 extends parallel to the source electrode 173. Therefore, the drain electrode 175 is parallel to at least part of the data line 171.

A first passivation layer 180a is formed on exposed portions of the data conductors 171, 173, and 175, the gate insulating layer 140, and the semiconductor 154. The first passivation layer 180a may be formed of any suitable material, such as, for example, an organic insulating material, an inorganic insulating material, etc.

A color filter 230 is formed on the first passivation layer 180a. An overcoat 80 is disposed on the color filter 230. The overcoat 80 may be omitted. The overcoat 80 may prevent a pigment of the color filter 230 from flowing into (or otherwise contaminating) the liquid crystal layer 3. The overcoat 80 may be formed of any suitable material, such as, for example, an inorganic insulating material, an organic insulating material, etc.

A pixel electrode 191 is formed on the overcoat 80. The pixel electrode 191 has a planar shape, that is, a plate shape, and is disposed in one pixel area. The pixel electrode 191 is physically and electrically connected to the drain electrode 175 through the first contact hole 185 formed on the first passivation layer 180a. A second passivation layer 180b is formed on the pixel electrode 191. The second passivation layer 180b may be formed of any suitable material, such as, for example, an organic insulating material, an inorganic insulating material, etc.

A light blocking member 220 is formed on the second passivation layer 180b. The light blocking member 220 includes a first light blocking member 220a that is formed along a direction in which the gate line 121 extends and overlaps the gate line 121 and the thin film transistor and a second light blocking member 220b that is formed along a direction in which the data line 171 extends and overlaps the data line 171. The first light blocking member 220a and the second light blocking member 220b are connected to each other. Although it has been described that the light blocking member 220 includes the first light blocking member 220a formed along a direction in which the gate line 121 extends and the second light blocking member 220b formed along a direction in which the data line 171 extends, it is also contemplated that the second light blocking member 220b may be omitted.

The common electrode 270 is formed directly on the light blocking member 220. The common electrode 270 has a curved edge that is substantially parallel to the first curved portion and the second curved portion of the data line 171. The common electrodes 270, which are disposed in adjacent pixels, are connected to each other. The common electrode 270 has a plurality of second cutouts 272 and a plurality of branch electrodes 271 defined by the plurality of second cutouts 272.

According to exemplary embodiments, the common electrode 270 is disposed directly on the light blocking member 220 so that the light blocking member 220 and the common electrode 270 are physically and electrically connected to each other. Therefore, even when a permittivity of the light blocking member 220 is high so that a voltage is well transmitted, a potential of the light blocking member 220 may be equal to that of the common electrode 270.

Although not illustrated, an alignment layer may be formed on the common electrode 270 and the second passivation layer 180b. The alignment layer may be a horizontal alignment layer and rubbed in a determined direction. It is also contemplated that the alignment layer may include a photo reaction material that is optically aligned.

Although not illustrated, the liquid crystal display may include a spacer disposed between the first substrate 110 and the second substrate 210 and a coloring member disposed in a position corresponding to the first contact hole 185. The spacer and the coloring member may be formed of the same material. To this end, the spacer and the coloring member may be component parts of a single feature, or, in other words, the spacer and the coloring member may extend (or protrude) from one another.

As seen in FIG. 7, the liquid crystal layer 3 is disposed between the first substrate 110 and the second substrate 210. The liquid crystal layer 3 includes a nematic liquid crystal material having a positive dielectric anisotropy. It is contemplated, however, that any other suitable type of liquid crystal may be utilized in association with exemplary embodiments described herein.

According to exemplary embodiments, the pixel electrode 191 may be applied with a data voltage from the drain electrode 175 and the common electrode 270 may be applied with a common voltage with a determined amplitude from a common voltage applying unit, which may be disposed outside the display area. The pixel electrode 191 and the common electrode 270, which are field generating electrodes generate, an electric field to rotate (or otherwise align) the liquid crystal molecules of the liquid crystal layer 3 disposed on the two electrodes 191 and 270 in a direction parallel to a direction of the electric field. Polarization of light passing through the liquid crystal layer 3 is varied depending on the rotational (or alignment) direction of the liquid crystal molecules.

In exemplary embodiments, the pixel electrode 191 and the common electrode 270 are formed on the first substrate 110 and the color filter 230 and the light blocking member 220 are also formed on the first substrate 110. Therefore, it is possible to prevent (or reduce) light leakage or deterioration of an aperture ratio that might otherwise occur as a result of a misalignment between the first substrate 110 and the second substrate 210. Further, the light blocking member 220 is formed directly below the common electrode 270 so that the light blocking member 220 is in contact with the common electrode 270. Therefore, even when the light blocking member 220 is formed of a material having a high permittivity so that the voltage is well transmitted thereto, the electric potential of the light blocking member 220 may be equal to that of the common electrode 270. Therefore, even though the light blocking member 220 and the pixel electrode 191 overlap each other with the second insulating layer 180b disposed therebetween, it is possible to prevent (or reduce) parasitic capacitance from occurring. In this manner, deterioration of the display quality that might otherwise occur in association with the formation of the parasitic capacitance may be prevented (or reduced).

According to exemplary embodiments, since the light blocking member 220 is formed directly contact with the common electrode 270 to have an equal electrical potential, it is possible to prevent (or reduce) the parasitic capacitance from occurring between the field generating electrodes, such as the pixel electrode 191 and the common electrode 270, and the light blocking member 220 without forming the light blocking member 220 using a relatively expensive material having a low permittivity.

Figure 8:
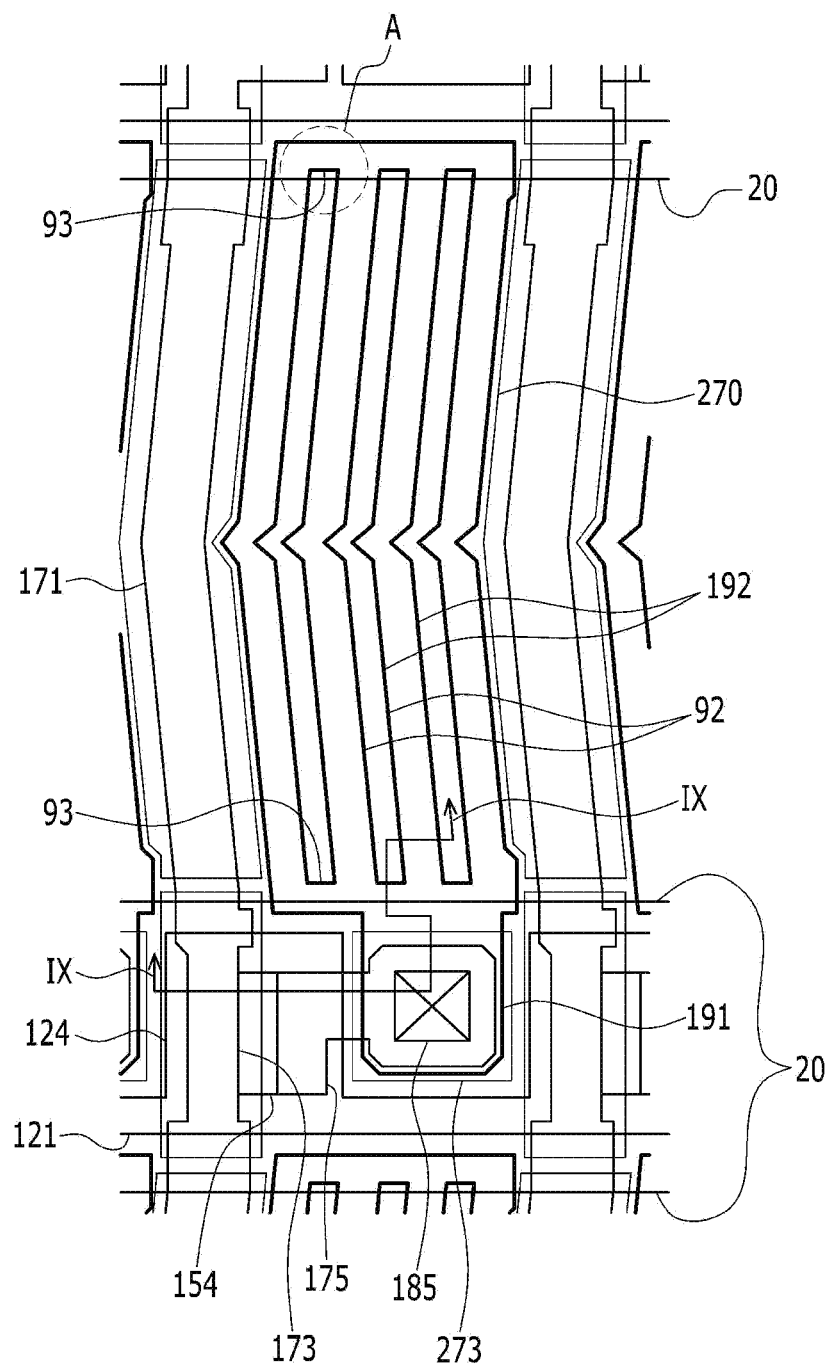
FIG. 8 is a layout view of a liquid crystal display, according to exemplary embodiments.
Figure 9:
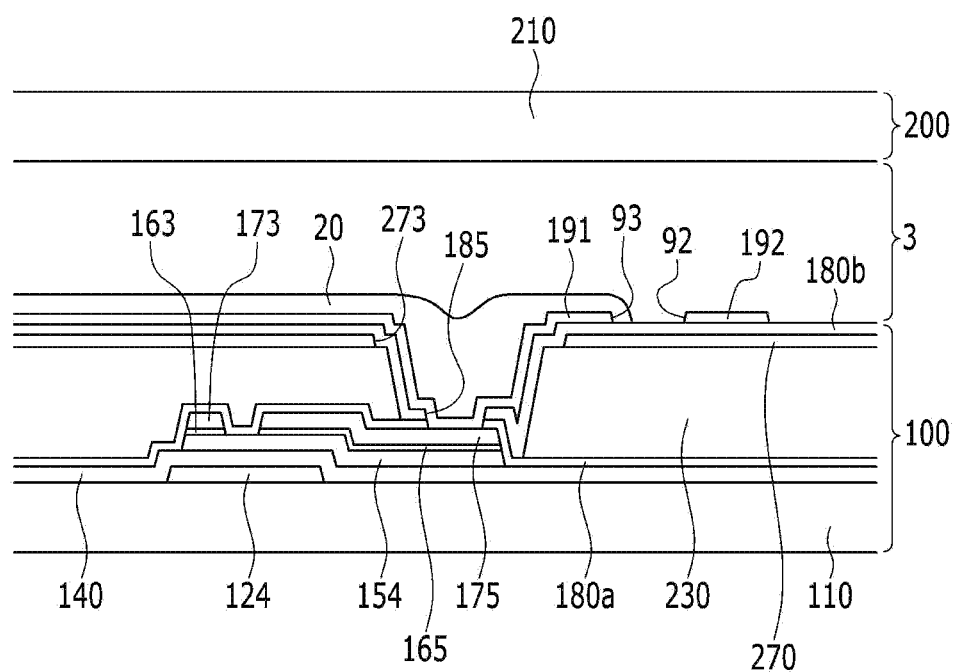
FIG. 9 is a cross-sectional view of the liquid crystal display of FIG. 8 taken along sectional line IX-IX, according to exemplary embodiments.

FIG. 8 is a layout view of a liquid crystal display, according to exemplary embodiments. FIG. 9 is a cross-sectional view of the liquid crystal display of FIG. 8 taken along sectional line IX-IX.

Referring to FIG. 8 and FIG. 9, the liquid crystal display includes a lower panel 100 including a first substrate 110 and an upper panel 200 including a second substrate 210 facing the first substrate 110. A liquid crystal layer 3 is disposed between the lower panel 100 and the upper panel 200.

The lower panel 100 will be described first.

A gate conductor including a gate line 121 is formed on the first substrate 110, which may be formed of any suitable material, such as, for example, transparent glass, plastic, etc. The gate line 121 includes a wide end portion (not illustrated) connected with a gate electrode 124 and other layers or an external driving circuit. The gate line 121 may be formed of any suitable conductive material, such as, for example, an aluminum-based metal, e.g., aluminum (Al) or an aluminum alloy, a silver-based metal, e.g., silver (Ag) or a silver alloy, a copper-based metal, e.g., copper (Cu) or a copper alloy, a molybdenum-based metal, e.g., molybdenum (Mo) or a molybdenum alloy, a chromium based metal, e.g., chromium (Cr) or a chromium alloy, a tantalum based metal, e.g., tantalum (Ta) or a tantalum alloy, a titanium based metal, e.g., titanium (Ti) or a titanium alloy, etc. The gate line 121 may have a single layer or a multilayer structure, which may include at least two conductive layers of different physical properties.

According to exemplary embodiments, a gate insulating layer 140 may be formed of any suitable material, e.g., silicon nitride ($SiN_x$), silicon oxide ($SiO_x$), etc., is formed on the gate conductors 121 and 124. The gate insulating layer 140 may have a single layer or a multilayer structure, which may include at least two insulating layers of different physical properties.

A semiconductor 154 may be formed of any suitable material, e.g., amorphous silicon, polysilicon, etc., is formed on the gate insulating layer 140. It is also contemplated that the semiconductor 154 may include an oxide semiconductor. Ohmic contacts 163 and 165 are formed on the semiconductor 154. The ohmic contacts 163 and 165 may be formed of any suitable material, such as, for example, n+ hydrogenated amorphous silicon, in which an n-type impurity, such as phosphorus, may be doped at a relatively high concentration, or silicide. The ohmic contacts 163 and 165 form a pair to be disposed on the semiconductor 154. If the semiconductor 154 is an oxide semiconductor, the ohmic contacts 163 and 165 may be omitted.

The liquid crystal display device may further include a data line 171 including a source electrode 173 and a data conductor including a drain electrode 175 respectively formed on the ohmic contacts 163 and 165 and the gate insulating layer 140. The data line 171 includes a wide end portion (not illustrated) connected with another layer or an external driving circuit. The data line 171 transmits a data signal and mainly extends in a first (e.g., vertical) direction intersecting the gate line 121 mainly extending in a second direction (e.g., horizontal) direction. The data line 171 may have a first curved portion, which has a bent shape, in order to obtain maximum (or at least increased) transmittance of the liquid crystal display. The data line 171 further includes a second curved portion that is bent to form a determined angle with the first curved portion in a center region of the pixel area. That is, the first and second curved portions meet at a center region of the pixel area to form a V shape. For instance, the first curved portion of the data line 171 may be bent at approximately 7° with respect to a vertical reference line perpendicular to a direction in which the gate line 121 mainly extends. The second curved portion, which is disposed at the center region of the pixel area, may be further bent to form approximately an angle of 7° to 15° with respect to the first curved portion.

The source electrode 173 is a part of the data line 171 and is disposed on the same line as the data line 171. The drain electrode 175 extends parallel to the source electrode 173. Therefore, the drain electrode 175 is at least parallel to part of the data line 171.

The gate electrode 124, the source electrode 173, and the drain electrode 175 form a thin film transistor (TFT) together with the semiconductor 154. A channel of the thin film transistor is formed in the semiconductor 154 between the source electrode 173 and the drain electrode 175.

According to exemplary embodiments, the source electrode 173, which is disposed on the same layer as the data line 171, and the drain electrode 175, which extends parallel to the data line 171, are formed such that a width of the thin film transistor is increased without increasing an area of the data conductor. In this manner, the aperture ratio of the liquid crystal display is increased.

The data line 171, the source electrode 173, and the drain electrode 175 may be formed of any suitable material, such as, for example, a refractory metal, e.g., molybdenum, chromium, tantalum, titanium, etc., or an alloy thereof. It is also noted that the data line 171, the source electrode 173, and the drain electrode 175 may have a single layer or a multilayer structure (not shown), which may include a film of one or more of the aforementioned refractory metals and a low resistance conductive layer (not illustrated). An example of the multilayer structure may include a double layer of a chromium or molybdenum (or alloys thereof) lower layer and an aluminum (or an alloy thereof) upper layer, or a triple layer of the molybdenum (or an alloy thereof) lower layer, an aluminum (or an alloy thereof) intermediate layer, and a molybdenum (or an alloy thereof) upper layer. It is contemplated, however, that the data line 171, the source electrode 173, and the drain electrode 175 may be formed of other various metals or conductors.

A first passivation layer 180a is disposed on exposed portions of the data conductors 171, 173, and 175, the gate insulating layer 140, and the semiconductor 154. The first passivation layer 180a may be formed of any suitable material, e.g., an organic insulating material, an inorganic insulating material, etc.

A color filter 230 is formed on the first passivation layer 180a. The color filter 230 may enable the unique display one of the primary colors, such as, for example, red, green, and blue, or yellow, cyan, and magenta. It is contemplated, however, that any suitable color may be utilized in association with the color filter 230. Even though not illustrated, the color filter 230 may further include other color filters to display a mixed color of the primary colors or white in addition to the primary colors. The color filter 230 may be made of any suitable material, such as, for example, an organic material, etc. Each color filter 230 may extend along the data line 171, and color filters 230 neighboring each other on a boundary of the data line 171 may overlap one another. The color filter 230 may not be formed in a location where a first contact hole 185 is formed.

A common electrode 270 is formed on the color filter 230. The common electrode 270 may be made of any suitable material, such as, for example, a transparent conductive material, e.g., aluminum zinc oxide (AZO), gallium zinc oxide (GZO), indium tin oxide (ITO), indium zinc oxide (IZO), etc. It is also contemplated that one or more conductive polymers (ICP) may be utilized, such as, for example, polyaniline (PANI), poly(3,4-ethylenedioxythiophene) poly (styrenesulfonate) (PEDOT:PSS), etc. The common electrode 270 has a planar shape formed on the entire (or substantially entire) surface of the substrate 110 as a whole plate. The common electrode 270 includes a first opening 273, which is formed in a region corresponding to the periphery of the thin film transistor. Common electrodes 270 that are disposed in adjacent pixels may be connected to each other so that a common voltage having a determined magnitude supplied from, for instance, an outside source of the display area, may be transmitted thereto. A second passivation layer 180b is formed on the common electrode 270. The second passivation layer 180b may be formed of any suitable material, such as, for example, an organic insulating material, an inorganic insulating material, etc.

According to exemplary embodiments, a pixel electrode 191 is formed on the second passivation layer 180b. The pixel electrode 191 includes a curved edge, which is substantially parallel to the first curved portion and the second curved portion of the data line 171. The pixel electrode 191 includes a plurality of cutouts 92 and a plurality of first branch electrodes 192 defined by the plurality of cutouts 92. The branch electrodes 192 of the pixel electrode 191 overlap the planar-shaped common electrode 270.

In the first cutout 92, an end of a branch portion that meets lateral end portions 93 that are adjacent to the gate line 191 mainly extends parallel to a branch portion of the first cutout 92. That is, the end of the branch portion that meets the lateral end portions 93 of the first cutout 92 is parallel to the first curved portion of the data line 171.

A first contact hole 185 is formed in the first passivation layer 180a, the color filter 230, and the second passivation layer 180b to expose the drain electrode 175. The pixel electrode 191 is electrically connected to the drain electrode 175 through the first contact hole 185. In this manner, the pixel electrode 191 may be provided with a data voltage. The first contact hole 185 may be formed at a location corresponding to the first opening 273 formed in the common electrode 270.

According to exemplary embodiments, a blocking layer 20 is formed on part of the pixel electrode 191. The blocking layer 20 includes, for instance, a relatively low dielectric organic material. The blocking layer 20 may further include a black pigment, and, as such, the blocking layer 20 may function as a light blocking member. The blocking layer 20 covers lateral ends of the first cutout 92, which are adjacent to the gate line 121, to reduce an influence of the fringe field applied to the end of the first cutout 92. The thickness of the blocking layer 20 may have an optical density (OD) of about 2.5 or more. The optical density is a unit indicating a degree of blocking of incident light, and may be calculated according to Equation 1.

$$OD = -\text{Log} * (\text{intensity of transmissive light/intensity of incident light}) \quad \text{Eq. 1}$$

For example, if the thickness is about 1.5 μm, such that the optical density becomes 2.5 using a material of which an optical density per each micrometer unit thickness is about 1.7. The maximum thickness of the blocking layer 20 may be a cell gap of the liquid crystal display, e.g., a thickness of the liquid crystal layer 3. In this manner, the thickness of the blocking layer 20 may be a value within a range from a thickness having an optical density of about 2.5 or more to the cell gap thickness. The optical density OD of the blocking layer 20 may become about 2.5 or more at a portion covering the end of the first cutout by setting a gap between an edge of the blocking layer 20 and the end of the first cutout 92. The dielectric constant of the blocking layer 20 may be less than about 50, and may be made of a metallic material, such as, for example, chromium (Cr), or an organic material containing a black dye.

According to exemplary embodiments, the lateral ends of the first cutout 92, which are adjacent to the gate line 121, are covered using the blocking layer 20 to prevent (or otherwise reduce) irregular movement of the liquid crystal molecules of the liquid crystal layer 3 due to the influence of a fringe field that may be generated at the end of the first cutout 92 when the pixel electrode 191 and/or the common electrode 270 are provided with corresponding voltages. As described, the irregular movement of the liquid crystal molecules that may occur at the end of the cutout 92 may be prevented to thereby prevent (or reduce) deterioration of transmittance of the liquid crystal display.

Although not illustrated, it is also contemplated that a first alignment layer may be formed on the pixel electrode 191 and the blocking layer 20.

The upper panel 200 will now be described.

Again, although not illustrated, a second alignment layer may be formed on a second substrate 210, which may be made of any suitable material, such as, for example, transparent glass, plastic, etc. The first alignment layer and the second alignment layer may be horizontal alignment layers; however, it is contemplated that any suitable alignment layer may be utilized in association with exemplary embodiments described herein.

A liquid crystal layer 3 may include liquid crystal molecules, and the liquid crystal molecules may be aligned, such that long axes thereof are parallel or perpendicular to the surfaces of the two panels 100 and 200, when an electric field is not applied thereto. The liquid crystal layer 3 may have positive or negative dielectric anisotropy. The liquid crystal molecules of the liquid crystal layer 3 may be aligned so that they have pretilts in a determined direction, and the pretilt directions of the liquid crystal molecules may be changed according to the dielectric anisotropy of the liquid crystal layer 3.

A backlight unit (not illustrated) configured to generate light to be supplied to the two panels 100 and 200 may be further included outside of the first substrate 110 of the lower panel 100, e.g., below the lower panel 100. The pixel electrode 191, to which a data voltage may be applied, generates an electric field in the liquid crystal layer 3 together with the common electrode 270, which may receive the common voltage, to determine directions of the liquid crystal molecules of the liquid crystal layer 3 and to effectuate the display of a corresponding image.

According to exemplary embodiments, the blocking layer 20 including the black pigment may be formed on part of the pixel electrode 191 rather than forming an additional light blocking member. In this manner, an influence of a fringe field generated at the lateral end of the cutout 92 of the pixel electrode 191 can be reduced, and, at the same time, the blocking layer 20 may function as a light blocking member. In turn, this may prevent (or reduce) irregular movement of the liquid crystal molecules, which may otherwise occur at the end portion of the cutout 92, as well as prevent deterioration of transmittance of the liquid crystal display.

Figure 10:
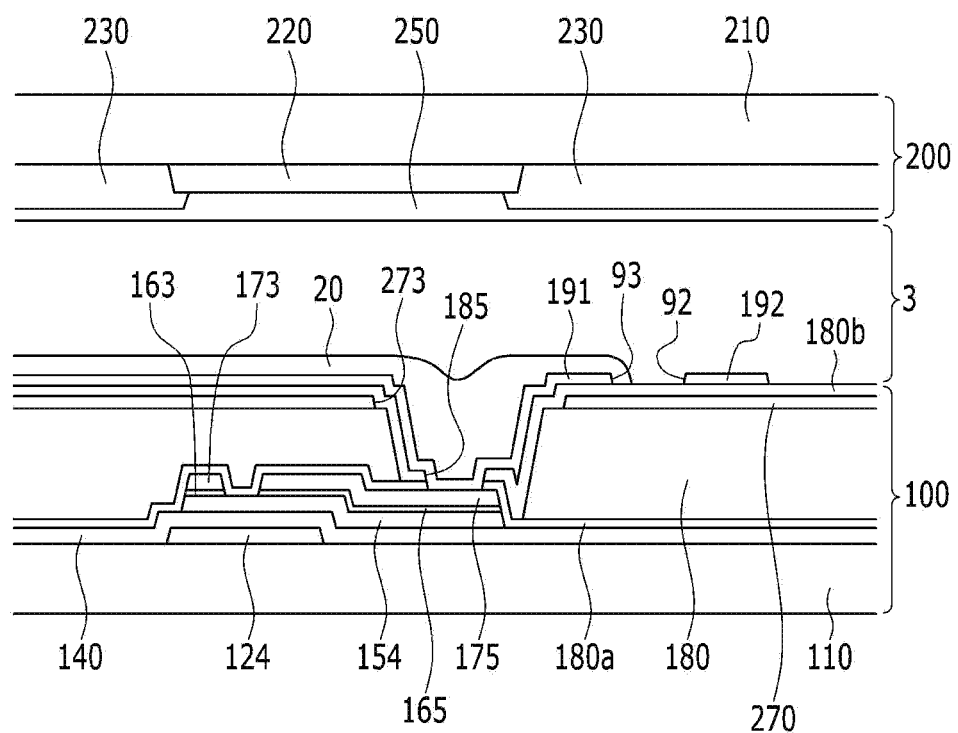
FIG. 10 is an alternative cross-sectional view of the liquid crystal display of FIG. 8 taken along sectional line IX-IX, according to exemplary embodiments.

With continued reference to FIG. 8, FIG. 10 is an alternative cross-sectional view of the liquid crystal display of FIG. 8 taken along sectional line IX-IX, according to exemplary embodiments. Referring to FIG. 10, the illustrated liquid crystal display is substantially similar to the liquid crystal display depicted in FIGS. 8 and 9. To avoid obscuring exemplary embodiments described herein, duplicative descriptions will be omitted.

Referring to FIG. 8 and FIG. 10, the liquid crystal display includes a lower panel 100 including a first substrate 110 and an upper panel 200 including a second substrate 210 facing the first substrate 110. A liquid crystal layer 3 is disposed between the lower panel 100 and the upper panel 200.

The lower panel 100 will be described first.

A gate conductor including a gate line 121 is formed on the first substrate 110. The gate line 121 includes a gate pad portion (not illustrated) connected to a gate electrode 124 and other layers or an external driving circuit. A gate insulating layer 140, which may be formed of any suitable material, e.g., silicon nitride (SiN$_x$), silicon oxide (SiO$_x$), etc., is formed on the gate conductors 121 and 124. A semiconductor 154, which may be formed of any suitable material, e.g., amorphous silicon, polysilicon, etc., is formed on the gate insulating layer 140. It is also contemplated that the semiconductor 154 may include an oxide semiconductor. Ohmic contacts 163 and 165 are formed on the semiconductor 154. That is, the ohmic contacts 163 and 165 form a pair to be disposed on the semiconductor 154. If the semiconductor 154 is an oxide semiconductor, the ohmic contacts 163 and 165 may be omitted.

According to exemplary embodiments, the data line 171 including a source electrode 173 and a data conductor including the drain electrode 175 are formed on the ohmic contacts 163 and 165 and the gate insulating layer 140. The data line 171 includes a data pad portion (not illustrated) connected with another layer or an external driving circuit. The data line 171 transmits a data signal and mainly extends in a first (e.g., vertical direction) intersecting with the gate line 121 mainly extending in a second direction (e.g., a horizontal direction). The data line 171 may have a first curved portion that has a bent shape to obtain maximum (or at least increased) transmittance of the liquid crystal display. The data line 171 further includes a second curved portion, which is bent to form a determined angle with the first curved portion, in a center region of the pixel area. That is, the first and second curved portions may meet at a center region of the pixel area to form a V shape. For instance, the first curved portion of the data line 171 may be bent at approximately 7° with respect to a vertical reference line, which is perpendicular to a direction in which the gate line 121 mainly extends. The second curved portion, which is disposed at the center region of the pixel area, is further bent to form an angle of approximately 7° to 15° with respect to the first curved portion.

In exemplary embodiments, the source electrode 173 is a part of the data line 171 and is disposed on the same layer as the data line 171. The drain electrode 175 extends parallel to the source electrode 173. Therefore, the drain electrode 175 is parallel to at least part of the data line 171. The gate electrode 124, the source electrode 173, and the drain electrode 175 form a thin film transistor (TFT) together with the semiconductor 154. A channel of the thin film transistor is formed in the semiconductor 154 between the source electrode 173 and the drain electrode 175.

A first passivation layer 180a is formed on exposed portions of the data conductors 171, 173, and 175, the gate insulating layer 140, and the semiconductor 154. The first passivation layer 180a may be formed of any suitable material, such as, for example, an organic insulating material, an inorganic insulating material, etc.

An organic layer 180 is formed on the first passivation layer 180a. The organic layer 180 is formed on the data line 171 to prevent (or reduce) unnecessary coupling between an electrode formed on the organic layer 180 and the data line 171. The organic layer 180 may not be formed in a portion where a first contact hole 185 is formed.

According to exemplary embodiments, a common electrode 270 is formed on the organic layer 180. The common electrode 270 has a planar shape formed on the entire (or substantially entire) surface of the first substrate 110 as a whole plate. To this end, the common electrode 270 includes a first opening 273 that is formed in a region corresponding to the periphery of the thin film transistor. Common electrodes 270 that are disposed in adjacent pixels may be connected to each other so that a common voltage having a determined magnitude may be supplied from outside of the display area to each of the common electrodes 270.

A second passivation layer 180b is formed on the common electrode 270. The second passivation layer 180b may be formed of any suitable material, such as, for example, an organic insulating material, an inorganic insulating material, etc. A pixel electrode 191 is formed on the second passivation layer 180b. The pixel electrode 191 includes a curved edge that is substantially parallel to the first curved portion and the second curved portion of the data line 171. The pixel electrode 191 includes a plurality of cutouts 92 and a plurality of first branch electrodes 192 defined by the plurality of cutouts 92. The first branch electrodes 192 of the pixel electrode 191 overlap the planar-shaped common electrode 270.

In the first cutout 92, an end of a branch portion that meets lateral end portions 93 adjacent to the gate line 191 mainly extends parallel to a branch portion of the first cutout 92. That is, the end of the branch portion that meets the lateral end portions 93 of the first cutout 92 is parallel to the first curved portion of the data line 171.

A first contact hole 185 is formed in the first passivation layer 180a, the organic layer 180, and the second passivation layer 180b to expose the drain electrode 175. The pixel electrode 191 is electrically connected to the drain electrode 175 through the first contact hole 185. In this manner, the pixel electrode 191 may be provided with a data voltage via the drain electrode 175. The first contact hole 185 is formed at a location corresponding to the first opening 273 formed in the common electrode 270.

According to exemplary embodiments, a blocking layer 20 is formed on part of the pixel electrode 191. The blocking layer 20 includes, for instance, a relatively low dielectric organic material. The blocking layer 20 covers lateral ends 93 of the first cutouts 92, which are adjacent to the gate line 121, to reduce an influence of the fringe field applied to the end of the first cutout 92. The thickness of the blocking layer 20 may have an optical density (OD) of about 2.5 or more. The maximum thickness of the blocking layer 20 may be a cell gap of the liquid crystal display, e.g., a thickness of the liquid crystal layer 3. In this manner, the thickness of the blocking layer 20 may be a value within a range from a thickness having an optical density of about 2.5 or more to the cell gap thickness. The optical density OD of the blocking layer 20 may become about 2.5 or more at a portion covering the end 93 of the first cutout 92 by setting a gap between an edge of the blocking layer 20 and the end of the first cutout 92. The dielectric constant of the blocking layer 20 may be less than about 50, and may be made of a metallic material, such as, for example, chromium (Cr), or an organic material containing a black dye.

According to exemplary embodiments, the lateral ends 93 of the first cutout 92, which are adjacent to the gate line 121, are covered by the blocking layer 20 to prevent (or reduce) irregular movement of the liquid crystal molecules of the liquid crystal layer 3 due to the influence of a fringe field that may be generated at the end 93 of the first cutout 92 when the pixel electrode 191 and/or the common electrode 270 are provided with corresponding voltages. As described, the irregular movement of the liquid crystal molecules that may occur at the end 93 of the cutout 92 may be prevented to thereby prevent (or reduce) deterioration of transmittance of the liquid crystal display.

Although not illustrated, it is also contemplated that a first alignment layer may be formed on the pixel electrode 191 and the blocking layer 20.

The upper panel 200 will now be described.

A light blocking member 220 is formed on the second substrate 210, which may be made of any suitable material, such as, for example, transparent glass, plastic, etc. The light blocking member 220 may also be referred to as a black matrix. The light blocking member 220 may be configured to prevent (or reduce) light leakage between pixels/sub-pixels. A plurality of color filters 230 are formed on the substrate 210 and in openings of the light blocking member 220. An overcoat 250 is formed on the color filters 230 and the light blocking member 220. The overcoat 250 may be made of any suitable material, such as, for example, an organic material. The overcoat 250 may be configured to prevent exposure of the color filters 230 and provide a flat surface. The overcoat 250 may be omitted.

Although not illustrated, a second alignment layer may be formed on the overcoat 250. The first alignment layer and the second alignment layer may be horizontal alignment layers. It is contemplated, however, that any suitable alignment layer may be utilized in association with exemplary embodiments described herein.

A liquid crystal layer 3 may include liquid crystal molecules (not shown), and the liquid crystal molecules may be aligned, such that long axes thereof are parallel or perpendicular to the panels 100 and 200, when an electric field is not applied thereto. The liquid crystal layer 3 may have positive or negative dielectric anisotropy. The liquid crystal molecules of the liquid crystal layer 3 may be aligned so that they have pretilts in a determined direction, and the pretilt directions of the liquid crystal molecules may be changed according to the dielectric anisotropy of the liquid crystal layer 3.

A backlight unit (not illustrated) configured to generate light to be supplied to the two panels 100 and 200 may be further included outside of the first substrate 110 of the lower panel 100, e.g., below the lower panel 100. The pixel electrode 191, to which a data voltage may be applied, generates an electric field in the liquid crystal layer 3 together with the common electrode 270, which may receive the common voltage, to determine directions of the liquid crystal molecules of the liquid crystal layer 3 and to effectuate display of a corresponding image.

According to exemplary embodiments, the blocking layer 20 is formed on part of the pixel electrode 191 so that the influence of the fringe field generated at the end of the first cutouts 92 of the pixel electrode 191 can be reduced, thereby preventing (or reducing) irregular movement of the liquid crystal molecules that may otherwise occur at the end portion of the first cutout 92. In turn, this may prevent (or reduce) deterioration of transmittance of the liquid crystal display.

Figure 11:
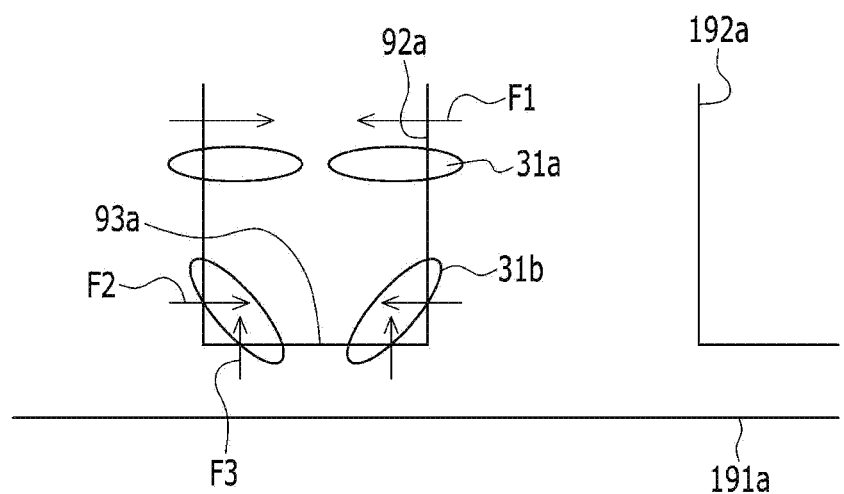
FIG. 11 is a conceptual view of a part of a conventional liquid crystal display.
Figure 12:
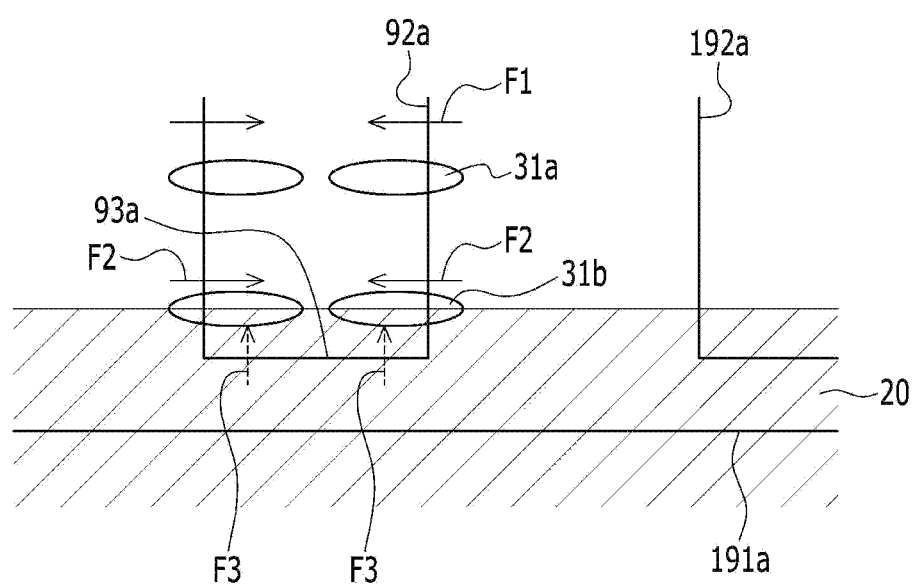
FIG. 12 is a conceptual view of a part of a liquid crystal display, according to exemplary embodiments.

An effect of the blocking layer 20 will now be described with reference to FIGS. 11 and 12. FIG. 11 is a conceptual view of a part of a conventional liquid crystal display. FIG. 12 is a conceptual view of a part of a liquid crystal display, according to exemplary embodiments.

Referring to FIG. 11, in a conventional liquid crystal display, a fringe field may be applied in a direction that is perpendicular to an edge of a cutout 92a formed in a field generation electrode 191a. When a branch portion of the cutout 92a is present, a first fringe field F1 may be generated in a direction that is perpendicular to an edge of the branch portion of the cutout 92a. In this manner, first liquid crystal molecules 31a at the periphery of the branch portion of the cutout 92a may rotate parallel to the direction of the first fringe field F1. These first liquid crystal molecules 31a may collide with each other, such that the first liquid crystal molecules 31a rotate in a direction parallel to a length direction in which the branch electrode 192a mainly extends, e.g., in a direction perpendicular to the direction of the first fringe field F1.

At an end 93a of the cutout 92a, a second fringe field F2 and a third fringe field F3 may be generated in corresponding directions that are perpendicular to the respective edges of the end of the cutout 92a. In this manner, second liquid crystal molecules 31b at the periphery of the end of the cutout 92a may rotate in a direction that is a vector sum of the second fringe field F2 direction and the third fringe field F3 direction. As such, the direction in which the second liquid crystal molecules 31b rotate is different from the direction in which the first liquid crystal molecules 31a rotate. As such, the rotation direction of the liquid crystal molecules at the periphery of the end of the cutout 92a becomes irregular. This, in turn, may cause transmittance of the liquid crystal display to be deteriorated at the periphery of the end of the cutout 92a.

Referring to FIG. 12, in a liquid crystal display according to exemplary embodiments, the end of the cutout 92a is covered by a relatively low dielectric blocking layer 20. In this manner, an influence of the third fringe field F3, which would otherwise be generated at the end of the cutout 92a, may be reduced. As such, the second liquid crystal molecules 31b located at the periphery of the end of the cutout 92a rotate in parallel with the first liquid crystal molecules 31a by the influence of the second fringe field F2 generated in a direction that is parallel with the direction of the first fringe field F1. Accordingly, the rotational direction of the liquid crystal molecules at the periphery of the cutout 92a can be prevented from being irregular, thereby preventing (or reducing) deterioration of transmittance, which may otherwise occur at the periphery of the end of the cutout 92a.

Figure 13:
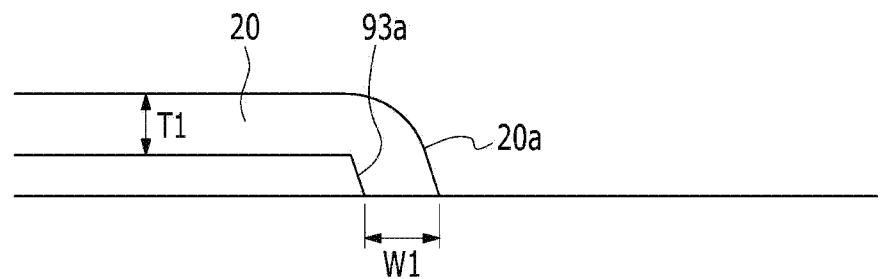
FIG. 13 is a cross-sectional view of a part of a liquid crystal display, according to exemplary embodiments.
Figure 14:
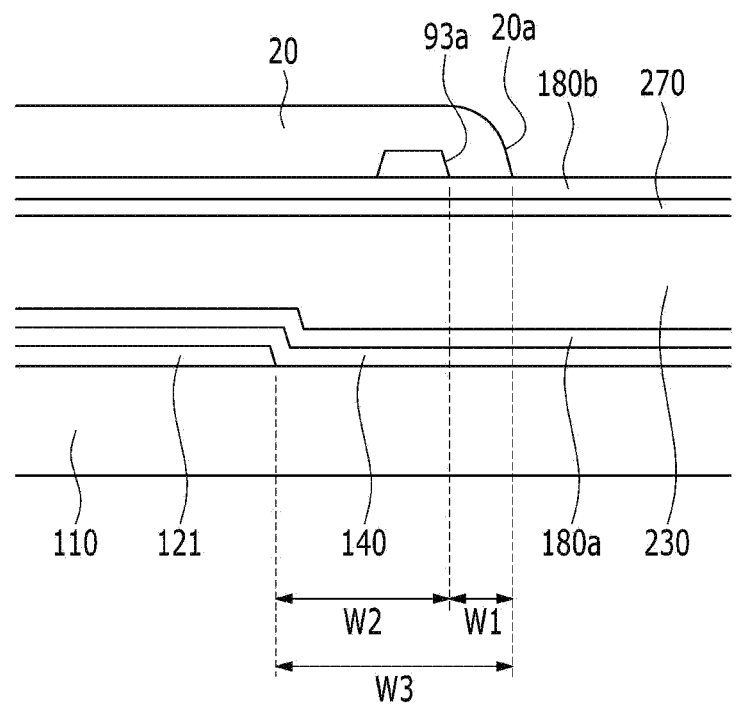
FIG. 14 is a cross-sectional view of part A of the liquid crystal display of FIG. 8, according to exemplary embodiments.

The blocking layer 20 will now be described in more detail in association with FIGS. 13 and 14. FIG. 13 and FIG. 14 are respective cross-sectional views of parts of a liquid crystal display, according to exemplary embodiments.

As previously described, the blocking layer 20 may be formed from a relatively low dielectric organic material. Referring to FIG. 13, a thickness T1 of the blocking layer 20 is set to make optical density (OD) of the blocking layer 20 to be 2.5 or more. The maximum thickness of the blocking layer 20 is a cell gap of the liquid crystal display, e.g., the thickness of the liquid crystal layer 3. Therefore, the thickness of the blocking layer 20 has a value within a range from a thickness having an optical density of about 2.5 or more to the cell gap thickness.

According to exemplary embodiments, a first width W1 between an edge 20a of the blocking layer 20 that is parallel with the gate line 121 and an end 93a of the cutout 92a is set to a value that makes the OD of the blocking layer 20 to be about 2.5 or more at the edge 20a covering the end 93a of the cutout 92a. The dielectric constant of the blocking layer 20 may be less than about 50. To this end, the blocking layer 20 may be made of a metallic material including, for instance, chromium (Cr) or an organic material containing a black dye.

FIG. 14 is a cross-sectional view of part A of the liquid crystal display of FIG. 8, according to exemplary embodiments.

Referring to FIG. 14, a second width W2 between the end 93a of the first cutout 92 adjacent to the gate line 121 and the gate line 121 may be wider than the first width W1 between the edge 20a of the blocking layer 20 that is parallel with the gate line 121 and the end 93a of the cutout 92a. As previously described with reference to FIG. 13, the first width W1 between the edge 20a of the blocking layer 20 that is parallel with the gate line 121 and the end 93a of the cutout 92a may be set to a value that makes the OD of the blocking layer 20 to be about 2.5 or more at the edge 20a covering the end 93a of the cutout 92a.

According to exemplary embodiments, the blocking layer 20 is formed on part of the pixel electrode 191 so that the influence of the fringe field generated at the end of the cutout 92a of the pixel electrode 191 can be reduced, thereby preventing irregular movement of the liquid crystal molecules, which may otherwise occur at the end portion of the cutout 92a. This, in turn, may prevent deterioration of transmittance of the liquid crystal display.

Figure 15:
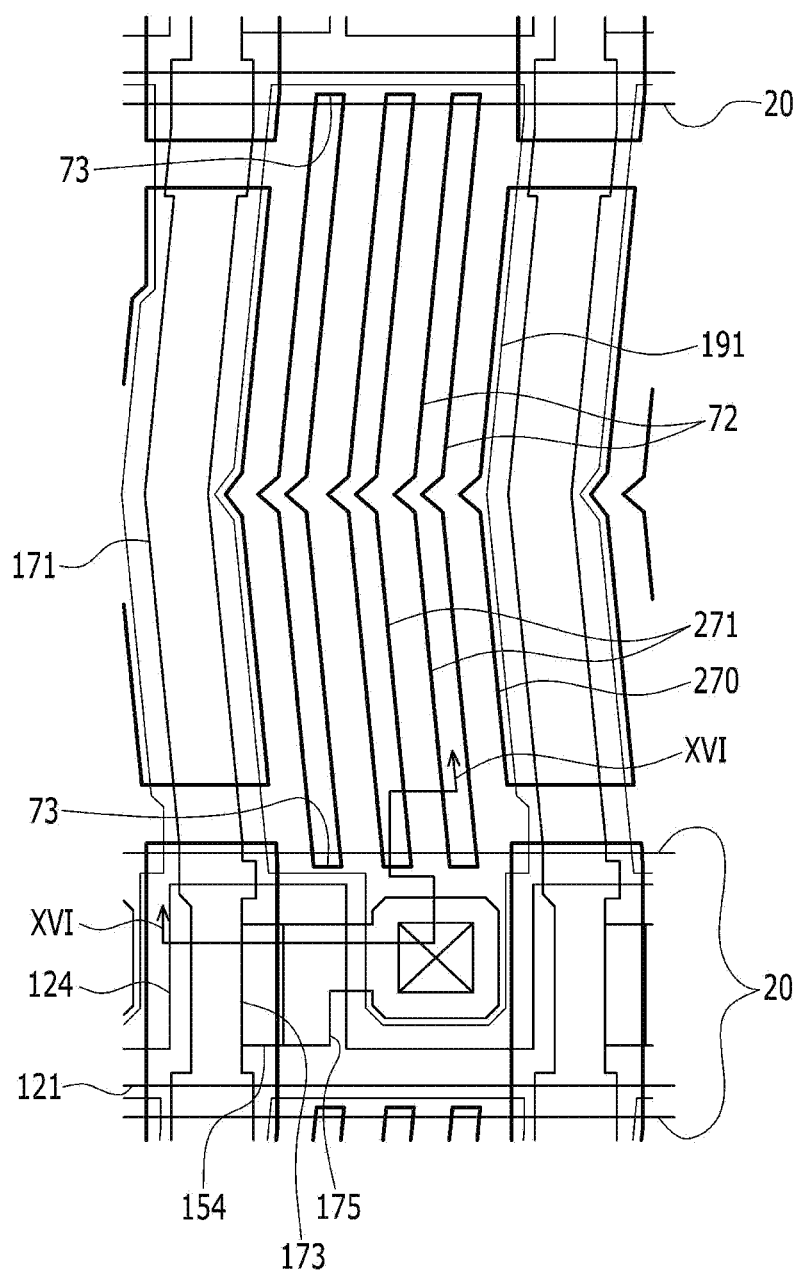
FIG. 15 is a layout view of a liquid crystal display, according to exemplary embodiments.
Figure 16:
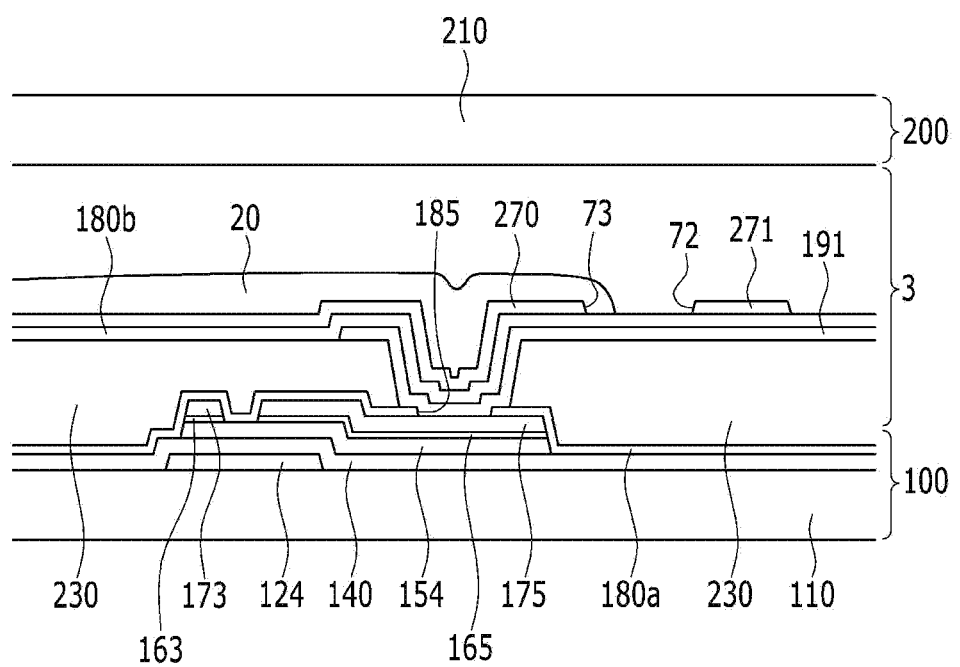
FIG. 16 is a cross-sectional view of the liquid crystal display of FIG. 15 taken along sectional line XVI-XVI, according to exemplary embodiments.

FIG. 15 is a layout view of a liquid crystal display, according to exemplary embodiments. FIG. 16 is a cross-sectional view of the liquid crystal display of FIG. 15 taken along sectional line XVI-XVI. Referring to FIG. 15 and FIG. 16, the illustrated liquid crystal display is substantially similar to the liquid crystal display depicted in FIG. 9. To avoid obscuring exemplary embodiments described herein, duplicative descriptions will be omitted.

Referring to FIGS. 15 and 16, the liquid crystal display includes a lower panel 100 including a first substrate 110 and an upper panel 200 including a second substrate 210 facing the first substrate 110. A liquid crystal layer 3 is disposed between the lower panel 100 and the upper panel 200.

The lower panel 100 will be described first.

A gate conductor including a gate line 121 is formed on the first substrate 110. The gate line 121 includes a wide end portion (not illustrated) connected with a gate electrode 124 and other layers or an external driving circuit. A gate insulating layer 140 is formed on the gate conductors 121 and 124. A semiconductor 154, which may be formed of any suitable material, e.g., amorphous silicon, polysilicon, etc., is formed on the gate insulating layer 140. It is also contemplated that the semiconductor 154 may include an oxide semiconductor. Ohmic contacts 163 and 165 are formed on the semiconductor 154. That is, the ohmic contacts 163 and 165 form a pair to be disposed on the semiconductor 154. If the semiconductor 154 is an oxide semiconductor, the ohmic contacts 163 and 165 may be omitted.

According to exemplary embodiments, the data line 171 including a source electrode 173 and a data conductor including the drain electrode 175 are formed on the ohmic contacts 163 and 165 and the gate insulating layer 140. The data line 171 includes a wide end portion (not illustrated) connected with another layer or an external driving circuit. The data line 171 transmits a data signal and mainly extends in a first (e.g., vertical) direction that intersects the gate line 121 mainly extending in a second (e.g., a horizontal) direction. The data line 171 may have a first curved portion that has a bent shape to obtain maximum (or at least increased) transmittance of the liquid crystal display. The data line 171 further includes a second curved portion, which is bent to form a determined angle with the first curved portion, in a center region of the pixel area. That is, the first and second curved portions meet at a center region of the pixel area to form a V shape. For instance, the first curved portion of the data line 171 may be bent at approximately 7° with respect to a vertical reference line, which is perpendicular to a direction in which the gate line 121 mainly extends. The second curved portion, which is disposed at the center region of the pixel area, is further bent to form an angle of approximately 7° to 15° with respect to the first curved portion.

In exemplary embodiments, the source electrode 173 is a part of the data line 171 and is disposed on the same layer as the data line 171. The drain electrode 175 extends parallel to the source electrode 173. Therefore, the drain electrode 175 is parallel to at least part of the data line 171. The gate electrode 124, the source electrode 173, and the drain electrode 175 form a thin film transistor (TFT) together with the semiconductor 154. A channel of the thin film transistor is formed in the semiconductor 154 between the source electrode 173 and the drain electrode 175.

A first passivation layer 180a is formed on exposed portions of the data conductors 171, 173, and 175, the gate insulating layer 140, and the semiconductor 154. The first passivation layer 180a may be formed of any suitable material, such as, for example, an organic insulating material, an inorganic insulating material, etc. A color filter 230 is formed on the first passivation layer 180a. The color filter 230 may not be formed in a portion where a first contact hole 185 is formed.

In exemplary embodiments, a pixel electrode 191 is formed on the color filter 230. The pixel electrode 191 has a planar shape formed in one pixel area as a plate-shaped electrode. The pixel electrode 191 includes a curved edge that is substantially parallel to the first curved portion and the second curved portion of the data line 171. The pixel electrode 191 is physically and electrically connected to the drain electrode 175 through the first contact hole 185 formed in the first passivation layer 180a and the color filter 230. A second passivation layer 180b is formed on the pixel electrode 191. The second passivation layer 180b may be formed of any suitable material, such as, for example, an organic insulating material, an inorganic insulating material, etc.

A common electrode 270 is formed on the second passivation layer 180b. The common electrode 270 may be made of any suitable material, such as, for example, a transparent conductive material, e.g., AZO, GZO, ITO, IZO, PANI, PEDOT:PSS, etc. The common electrode 270 includes a plurality of cutouts 72 and a plurality of second branch electrodes 271 defined by the plurality of cutouts 72. The second branch electrode 271 of the common electrode 270 overlaps the planar-shaped pixel electrode 191. The common electrodes 270 disposed in adjacent pixels are connected to each other so that a common voltage having a determined magnitude provided from, for instance, a source, e.g., an external source outside of the display area, may be transmitted thereto.

In the second cutout 72, an end of a branch portion that meets lateral ends 73 adjacent to the gate line 121 mainly extends parallel to the branch portion of the second cutout 72. That is, the end of the branch portion that meets the lateral ends 73 of the second cutout 72 is parallel to the first curved portion of the data line 171.

According to exemplary embodiments, a blocking layer 20 is formed on part of the common electrode 270. The blocking layer 20 includes, for instance, a relatively low dielectric organic material. The blocking layer 20 may further include a black pigment, and, as such, the blocking layer 20 may function as a light blocking member. The blocking layer 20 covers lateral ends 73 of the second cutouts 72, which are adjacent to the gate line 121, to reduce an influence of a fringe field applied to the end of the second cutout 72. The thickness of the blocking layer 20 has an optical density (OD) of about 2.5 or more. The maximum thickness of the blocking layer 20 is a cell gap of the liquid crystal display, e.g., a thickness of the liquid crystal layer 3. In this manner, the thickness of the blocking layer 20 may have a value within a range from a thickness having an optical density of about 2.5 or more to the cell gap thickness. The optical density OD of the blocking layer 20 may become about 2.5 or more at a portion covering the end of the second cutout 72 by setting a gap between an edge of the blocking layer 20 and the end 73 of the second cutout 72. The dielectric constant of the blocking layer 20 is about less than 50, and may be made of a metallic material, such as, for example, chromium (Cr), or an organic material containing a black dye.

According to exemplary embodiments, the lateral ends 73 of the second cutout 72, which are adjacent to the gate line 121, are covered using the blocking layer 20 to prevent (or reduce) irregular movement of the liquid crystal molecules of the liquid crystal layer 3 due to the influence of the fringe field that may be generated at the end 73 of the second cutout 72. As described, the irregular movement of the liquid crystal molecules that may occur at the end 73 of the cutout may be prevented to thereby prevent (or reduce) deterioration of transmittance of the liquid crystal display.

Although not illustrated, it is also contemplated that a first alignment layer may be formed on the common electrode 270 and the blocking layer 20.

The upper panel 200 will now be described.

Again, although not shown, a second alignment layer may be formed on the second substrate 210, which may be made of any suitable material, e.g., transparent glass, plastic, etc. The first alignment layer and the second alignment layer may be horizontal alignment layers; however, it is contemplated that any suitable type of alignment layer may be utilized in association with exemplary embodiments described herein.

A liquid crystal layer 3 may include liquid crystal molecules (not shown), and the liquid crystal molecules may be aligned, such that long axes thereof are parallel or perpendicular to the surfaces of the two panels 100 and 200, when an electric field is not applied thereto. The liquid crystal layer 3 may have positive or negative dielectric anisotropy. The liquid crystal molecules of the liquid crystal layer 3 may be aligned so that the liquid crystal molecules have pretilts in a determined direction, and the pretilt directions of the liquid crystal molecules may be changed according to the dielectric anisotropy of the liquid crystal layer 3.

A backlight unit (not illustrated) configured to generate light to supplied to the two panels 100 and 200 may be further included outside of the substrate 110 of the lower panel 100, e.g., below the lower panel 100. The pixel electrode 191, to which a data voltage may be applied, generates an electric field in the liquid crystal layer 3 together with the common electrode 270, which may receive the common voltage, to determine directions of the liquid crystal molecules of the liquid crystal layer 3 and to effectuate display of a corresponding image.

According to the exemplary embodiments, the blocking layer 20 including the black pigment is formed on part of the common electrode 270 rather than forming an additional light blocking member so that the influence of the fringe field generated at the end 73 of the cutout 72 of the common electrode 270 may be reduced, and, at the same time, the blocking layer 20 may function as a light blocking member. This may prevent (or reduce) irregular movement of the liquid crystal molecules, which may occur at the end portion 73 of the cutout 72 and prevent (or reduce) deterioration of transmittance of the liquid crystal display.

Figure 17:
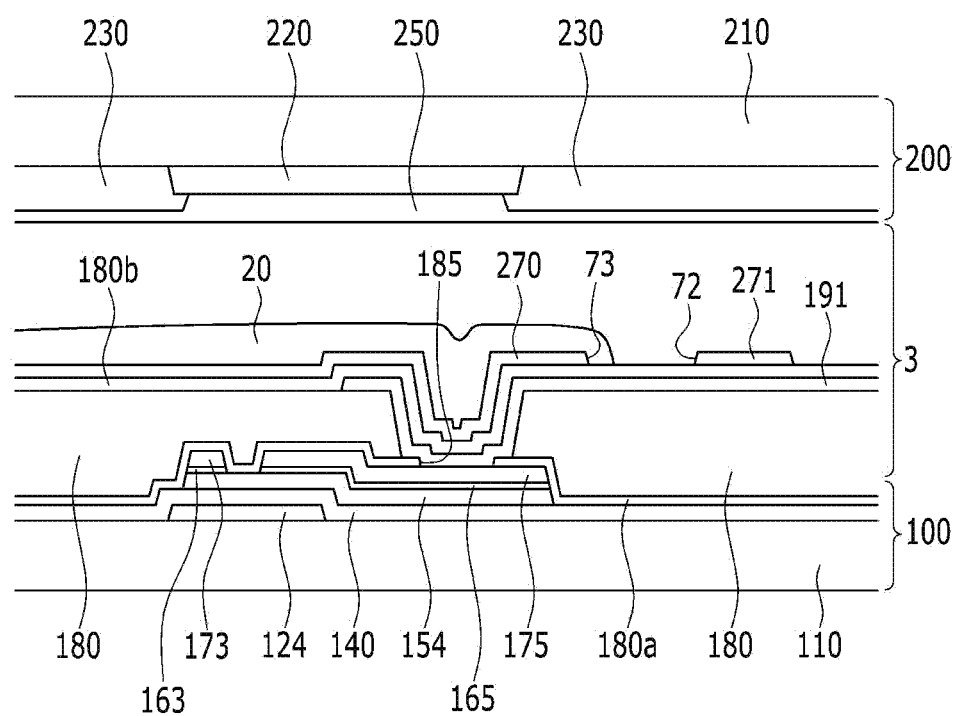
FIG. 17 is a cross-sectional view of the liquid crystal display of FIG. 15 taken along sectional line XVI-XVI, according to exemplary embodiments.

With continued reference to FIG. 15, FIG. 17 is an alternative cross-sectional view of the liquid crystal display of FIG. 15 taken along sectional line XVI-XVI, according to exemplary embodiments. Referring to FIG. 15 and FIG. 17, the illustrated liquid crystal display is substantially similar to the liquid crystal display depicted in FIG. 8 and FIG. 10. To avoid obscuring exemplary embodiments described herein, duplicative descriptions will be omitted.

Referring to FIG. 15 and FIG. 17, the liquid crystal display includes a lower panel 100 including a first substrate 110 and an upper panel 200 including a second substrate 210 facing the first substrate 110. A liquid crystal layer 3 is disposed between the lower panel 100 and the upper panel 200.

The lower panel 100 will be described first.

A gate conductor including a gate line 121 is formed on the first substrate 110. The gate line 121 includes a wide end portion (not illustrated) connected to a gate electrode 124 and other layers or an external driving circuit. A gate insulating layer 140, which may be formed of any suitable material, e.g., silicon nitride ($SiN_x$), silicon oxide ($SiO_x$), etc., is formed on the gate conductors 121 and 124. A semiconductor 154, which may be formed of any suitable material, e.g., amorphous silicon, polysilicon, etc., is formed on the gate insulating layer 140. It is also contemplated that the semiconductor 154 may include an oxide semiconductor. Ohmic contacts 163 and 165 are formed on the semiconductor 154. That is, the ohmic contacts 163 and 165 form a pair to be disposed on the semiconductor 154. If the semiconductor 154 is an oxide semiconductor, the ohmic contacts 163 and 165 may be omitted.

According to exemplary embodiments, the data line 171 including a source electrode 173 and a data conductor including the drain electrode 175 are formed on the ohmic contacts 163 and 165 and the gate insulating layer 140. The data line 171 includes a wide end portion (not illustrated) connected with another layer or an external driving circuit. The data line 171 transmits a data signal and mainly extends in a first (e.g., vertical) direction intersecting with the gate line 121 mainly extending in a second direction (e.g., a horizontal direction). The data line 171 may have a first curved portion that has a bent shape to obtain maximum (or at least increased) transmittance of the liquid crystal display. The data line 171 further includes a second curved portion, which is bent to form a determined angle with the first curved portion, in a center region of the pixel area. That is, the first and second curved portions may meet at a center region of the pixel area to form a V shape. For instance, the first curved portion of the data line 171 may be bent at an angle of approximately 7° with respect to a vertical reference line, which is perpendicular to a direction in which the gate line 121 mainly extends. The second curved portion, which is disposed at the center region of the pixel area, is further bent to form an angle of approximately 7° to 15° with respect to the first curved portion.

In exemplary embodiments, the source electrode 173 is a part of the data line 171 and is disposed on the same layer as the data line 171. The drain electrode 175 extends parallel to the source electrode 173. Therefore, the drain electrode 175 is parallel to at least part of the data line 171. The gate electrode 124, the source electrode 173, and the drain electrode 175 form a thin film transistor (TFT) together with the semiconductor 154. A channel of the thin film transistor is formed in the semiconductor 154 between the source electrode 173 and the drain electrode 175.

A first passivation layer 180a is formed on exposed portions of the data conductors 171, 173, and 175, the gate insulating layer 140, and the semiconductor 154. The first passivation layer 180a may be formed of any suitable material, such as, for example, an organic insulating material, an inorganic insulating material, etc.

An organic layer 180 is formed on the first passivation layer 180a. The organic layer 180 is formed on the data line 171 to prevent (or reduce) unnecessary coupling between an electrode formed on the organic layer 180 and the data line 171. The organic layer 180 may not be formed in a portion where a first contact hole 185 is formed.

According to exemplary embodiments, a pixel electrode 191 is formed on the organic layer 180. The pixel electrode 191 has a planar shape formed in one pixel area as a whole plate. The pixel electrode 191 includes a curved edge that is substantially parallel to the first curved portion and the second curved portion of the data line 171. The pixel electrode 191 is physically and electrically connected to the drain electrode 175 through a first contact hole formed in the first passivation layer 180a and the color filter 230.

A second passivation layer 180b is formed on the pixel electrode 191. The second passivation layer 180b may be formed of any suitable material, such as, for example, an organic insulating material, an inorganic insulating material, etc. A common electrode 270 is formed on the second passivation layer 180b. The common electrode 270 may be made of any suitable material, such as, for example, a transparent conductive material, e.g., AZO, GZO, ITO, IZO, PANI, PEDOT:PSS, etc. The common electrodes 270 disposed in adjacent pixels may be connected to each other so that a common voltage having a determined magnitude supplied from outside of the display area may be transmitted thereto. Second branch electrodes 271 of the common electrode 270 overlap the planar-shaped pixel electrode 191.

In the second cutout 72, an end of a branch portion that meets lateral ends 73 adjacent to the gate line 121 extends parallel to the branch portion of the second cutout 72. That is, the end of the branch portion that meets the lateral ends 73 of the second cutout 72 is parallel with the first curved portion of the data line 171.

A first contact hole 185 is formed in the first passivation layer 180a and the organic layer 180, to expose the drain electrode 175. The pixel electrode 191 is electrically connected to the drain electrode 175 through the first contact hole 185. In this manner, the pixel electrode 191 may be provided with a data voltage via the drain electrode 175.

According to exemplary embodiments, a blocking layer 20 is formed on part of the common electrode 270. The blocking layer 20 covers lateral ends 73 of the second cutout 72, which are adjacent to the gate line 121, to reduce an influence of the fringe field applied to the end 73 of the second cutout 72. The thickness of the blocking layer 20 has an optical density (OD) of about 2.5 or more. The maximum thickness of the blocking layer 20 may be a cell gap of the liquid crystal display, e.g., a thickness of the liquid crystal layer 3. In this manner, the thickness of the blocking layer 20 may have a value within a range from a thickness having an optical density of about 2.5 or more to the cell gap thickness. The optical density OD of the blocking layer 20 may become about 2.5 or more at a portion covering the end 73 of the second cutout 72 by setting a gap between an edge of the blocking layer 20 and the end 73 of the second cutout 72. The dielectric constant of the blocking layer 20 is less than about 50, and may be made of a metallic material, such as, for example, chromium (Cr) or an organic material containing a black dye.

According to exemplary embodiments, the lateral ends 73 of the second cutout 72, which are adjacent to the gate line 121, are covered by the blocking layer 20 to prevent (or reduce) irregular movement of the liquid crystal molecules of the liquid crystal layer 3 due to the influence of the fringe field that may be generated at the end 73 of the second cutout 72 when the pixel electrode 191 and/or the common electrode 270 are provided with corresponding voltages. As described, the irregular movement of the liquid crystal molecules that may occur at the end 73 of the cutout 72 may be prevented to thereby prevent (or reduce) deterioration of transmittance of the liquid crystal display.

Although not illustrated, it is also contemplated that a first alignment layer may be formed on the common electrode 270 and the blocking layer 20.

The upper panel 200 will now be described.

A light blocking member 220 is formed on the second substrate 210, which may be made of any suitable material, such as, for example, transparent glass, plastic, etc. The light blocking member 220 may also be referred to as a black matrix. The light blocking member 220 may be configured to prevent light leakage between pixels/sub-pixels. A plurality of color filters 230 are formed on the substrate 210. An overcoat 250 is formed on the color filters 230 and the light blocking member 220. The overcoat 250 may be made of any suitable material, such as, for example, an organic material. The overcoat 250 may be configured to prevent exposure of the color filters 230 and provide a flat surface. The overcoat 250 may be omitted.

Although not illustrated, a second alignment layer may be formed on the overcoat 250. The first alignment layer and the second alignment layer may be horizontal alignment layers. It is contemplated, however, that any suitable alignment layer may be utilized in association with exemplary embodiments described herein.

A liquid crystal layer 3 may include liquid crystal molecules (not shown), and the liquid crystal molecules may be aligned, such that long axes thereof are parallel or perpendicular to the panels 100 and 200, when an electric field is not applied to the liquid crystal layer 3. The liquid crystal layer 3 may have positive or negative dielectric anisotropy. The liquid crystal molecules of the liquid crystal layer 3 may be aligned so that they have pretilts in a determined direction, and the pretilt directions of the liquid crystal molecules may be changed according to the dielectric anisotropy of the liquid crystal layer 3.

A backlight unit (not illustrated) configured to generate light to be supplied to the two panels 100 and 200 may be further included outside of the first substrate 110 of the lower panel 100, e.g., below the lower panel 100. The pixel electrode 191, to which the data voltage may be applied, generates an electric field in the liquid crystal layer 3 together with the common electrode 270, which may receive the common voltage, to determine directions of the liquid crystal molecules of the liquid crystal layer 3 and to effectuate display of a corresponding image.

According to exemplary embodiments, the blocking layer 20 is formed on part of the common electrode 270 so that the influence of the fringe field generated at the end 73 of the cutout 72 of the common electrode 270 can be reduced, thereby preventing irregular movement of the liquid crystal molecules, which may occur at the end portion 73 of the cutout 72. In this manner, exemplary embodiments enable prevention (or reduction) in deterioration of transmittance of the liquid crystal display.

Experimental examples of exemplary embodiments will be described with reference to FIGS. 18A to 18D. FIGS. 18A, 18B, 18C, and 18D provide results of transmittances of various experimental examples, according to exemplary embodiments. That is, FIGS. 18A to 18D are respective electron micrographs illustrating transmittance results of exemplary embodiments.

It is noted that, in the liquid crystal display, a blocking layer 20 is formed and transmittance of the liquid crystal layer is measured while changing a dielectric constant of the blocking layer 20 to about 5, about 50, about 100, and about 200. Results of the measurements are shown in FIGS. 18A to 18D. In these experimental examples, the rest of the conditions are the same, and only the dielectric constant of the blocking layer 20 is changed.

Figure 18A:
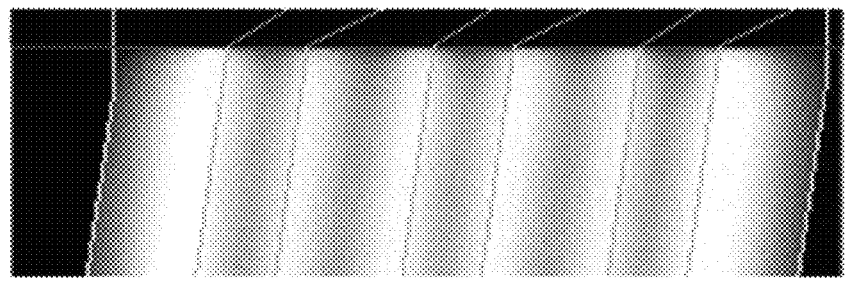
FIGS. 18A, 18B, 18C, and 18D provide results of transmittances of various experimental examples, according to exemplary embodiments.
Figure 18A:
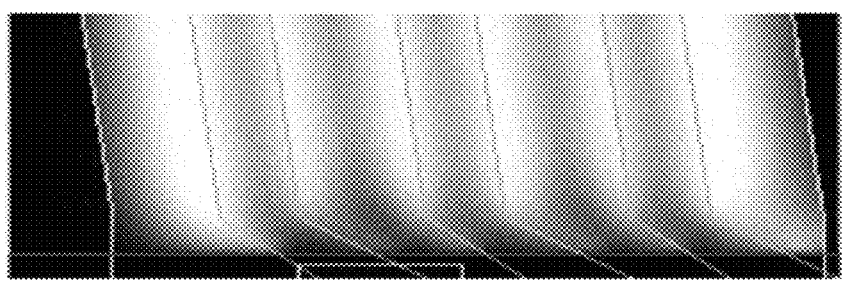
Figure 18B:
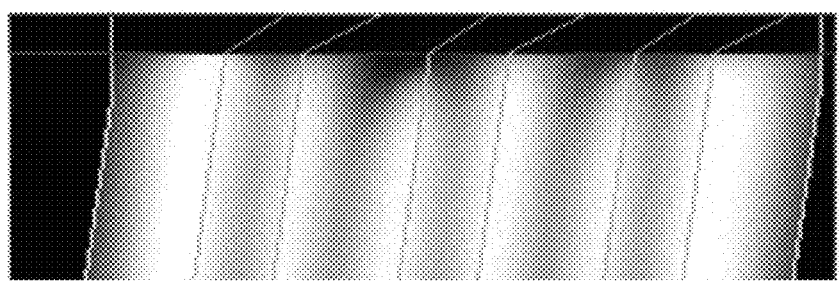
Figure 18B:
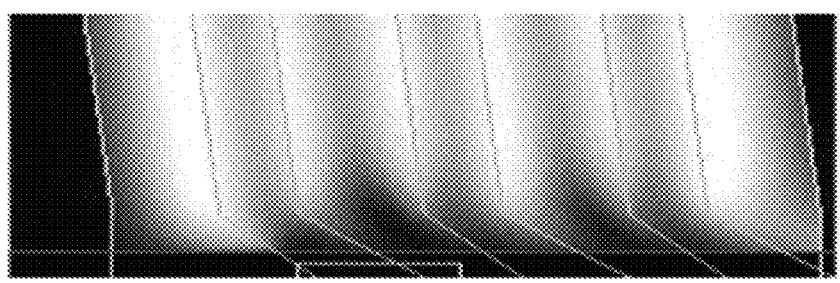
Figure 18C:
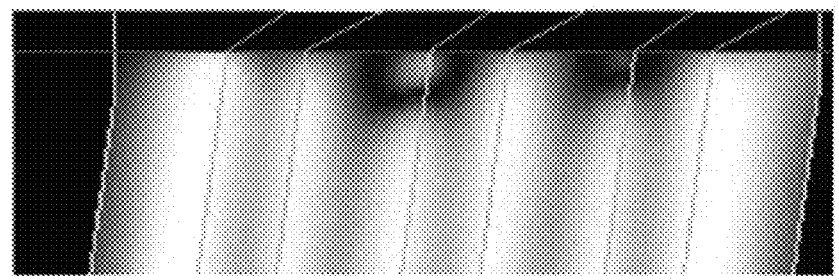
Figure 18D:
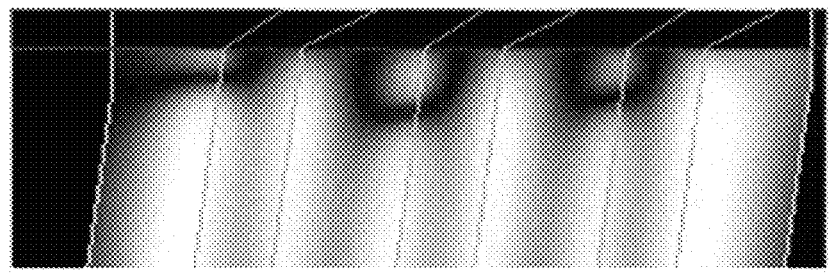

FIG. 18A shows a result in which the dielectric constant of the blocking layer 20 is about 5, FIG. 18B shows a result in which the dielectric constant of the blocking layer 20 is about 50, FIG. 18C shows a result in which the dielectric constant of the blocking layer 20 is about 100, and FIG. 18D shows a result in which the dielectric constant of the blocking layer 20 is about 200.

Referring to FIGS. 18A to 18D, when the blocking layer 20 has a dielectric constant of less than about 50, deterioration of transmittance due to irregular movement of the liquid crystal molecules does not occur as much. However, when the dielectric constant of the blocking layer 20 becomes higher than 50, transmittance may be deteriorated due to irregular movement of the liquid crystal molecules. This is because, when the dielectric constant of the blocking layer 20 is increased, the blocking layer 20 cannot sufficiently reduce an influence of a fringe field generated at an end of an electric field generation electrode.

According to exemplary embodiments, the blocking layer 20 is formed to cover the end portion of the electric field generation electrode and the dielectric constant of the blocking layer 20 is set to be less than 50 so as to reduce the influence of the fringe field generated at the end of the cutout of the electric field generation electrode, thereby preventing irregular movement of liquid crystal molecules, which may occur at the end of the cutout. This may, in turn, preventing (or reduce) deterioration of transmittance of the liquid crystal display.

Although various exemplary embodiments have been described with respect to liquid crystal displays, it is contemplated that various exemplary embodiments are also applicable to other display devices including two field generating electrodes formed on the same substrate.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display, comprising:
a first substrate;
a gate line disposed on the first substrate;
a data line disposed on the first substrate;
a first passivation layer disposed on the gate line and the data line;
a color filter disposed on the first passivation layer;
a common electrode disposed on the first substrate and on the color filter;
a pixel electrode disposed on the first substrate and overlapping the common electrode;
a second passivation layer disposed between the common electrode and the pixel electrode; and
a light blocking member disposed between the first substrate and the second passivation layer,
wherein the light blocking member directly contacts the common electrode.

2. The liquid crystal display of claim 1, further comprising:
a second substrate facing the first substrate; and
a spacer disposed between the first substrate and the second substrate.

3. The liquid crystal display of claim 2, further comprising:
a thin film transistor connected to the gate line and the data line; and
a coloring member disposed on the pixel electrode and overlapping the thin film transistor.

4. The liquid crystal display of claim 3, wherein:
the spacer and the coloring member are formed on the same layer.

5. The liquid crystal display of claim 1, wherein:
the pixel electrode comprises a plurality of cutouts; and
the common electrode is has a planar shape.

6. The liquid crystal display of claim 1, further comprising:
an overcoat disposed on the color filter,
wherein the overcoat is disposed between the common electrode and the color filter.

7. A liquid crystal display, comprising:
a first substrate;
a gate line disposed on the first substrate;
a data line disposed on the first substrate;
a first passivation layer disposed on the gate line and the data line;
a color filter disposed on the first passivation layer;
a common electrode disposed on the first substrate and on the color filter;
a pixel electrode disposed on the first substrate and overlapping the common electrode;
a second passivation layer disposed between the common electrode and the pixel electrode, the second passivation layer comprising an opening; and
a light blocking member disposed on the first substrate, the common electrode, and the second passivation layer,
wherein the light blocking member is connected to the common electrode through the opening in the second passivation layer.

8. The liquid crystal display of claim 7, further comprising:
a second substrate facing the first substrate; and
a spacer disposed between the first substrate and the second substrate.

9. The liquid crystal display of claim 8, further comprising:
a thin film transistor connected to the gate line and the data line; and a coloring member disposed on the pixel electrode and overlapping the thin film transistor.

10. The liquid crystal display of claim 9, wherein:
the spacer and the coloring member are one contiguous formation.

11. The liquid crystal display of claim 7, wherein:
the pixel electrode comprises a plurality of cutouts; and
the common electrode has a planar shape.

12. The liquid crystal display of claim 7, further comprising:
an overcoat disposed on the color filter,
wherein the overcoat is disposed between the common electrode and the color filter.

13. A liquid crystal display, comprising:
a first substrate;
a gate line disposed on the first substrate;
a data line disposed on the first substrate;
a first passivation layer disposed on the gate line and the data line;
a color filter disposed on the first passivation layer;
a pixel electrode disposed on the first substrate and on the color filter;
a common electrode disposed on the first substrate and overlapping the pixel electrode;
a second passivation layer disposed between the pixel electrode and the common electrode; and
a light blocking member disposed on the first substrate and directly contacting the common electrode.

14. The liquid crystal display of claim 13, further comprising:
a second substrate facing the first substrate; and
a spacer disposed between the first substrate and the second substrate.

15. The liquid crystal display of claim 14, further comprising:
a thin transistor connected to the gate line and the data line; and
a coloring member disposed on the common electrode and overlapping the thin film transistor.

16. The liquid crystal display of claim 15, wherein:
the spacer and the coloring member are a contiguous formation.

17. The liquid crystal display of claim 13, wherein:
the pixel electrode has a planar shape; and
the common electrode comprises a plurality of cutouts.

18. The liquid crystal display of claim 13, further comprising:
an overcoat disposed on the color filter,
wherein the overcoat is disposed between the pixel electrode and the color filter.

19. A liquid crystal display, comprising:
a substrate;
a gate line disposed on the substrate;
a data line disposed on the substrate;
a first passivation layer disposed on the gate line and the data line;
a first electrode disposed on the first passivation layer;
a second passivation layer disposed on the first electrode;
a second electrode disposed on the second passivation layer, the second electrode comprising a plurality of cutouts; and
a blocking layer disposed on the second electrode,
wherein the blocking layer is at least partially disposed in the plurality of cutouts of the second electrode to fully cover first edges of the plurality of cutouts of the second electrode, the first edges extending substantially parallel to the gate line among edges of the plurality of cutouts of the second electrode.

20. The liquid crystal display of claim 19, wherein:
the blocking layer comprises a black pigment.

21. The liquid crystal display of claim 20, wherein:
a dielectric constant of the blocking layer is less than about 50.

22. The liquid crystal display of claim 21, wherein:
an optical density of the blocking layer is greater than about 2.5.

23. The liquid crystal display of claim 22, wherein:
first gaps between the first edges of the cutouts and an edge of the blocking layer cause, at least in part, an optical density of the blocking layer to be greater than about 2.5 at the edge of the blocking layer.

24. The liquid crystal display of claim 23, wherein:
a second gap between the edge of the blocking layer and an edge of the gate line is greater than each of the first gaps.

25. The liquid crystal display of claim 20, wherein:
the optical density of the blocking layer is greater about 2.5.

26. The liquid crystal display of claim 25, wherein:
first gaps between the first edges of the cutouts and an edge of the blocking layer cause, at least in part, the optical density of the blocking layer to be greater than about 2.5 at the edge of the blocking layer.

27. The liquid crystal display of claim 26, wherein:
a second gap between the edge of the blocking layer and an edge of the gate line is greater than each of the first gaps.

28. The liquid crystal display of claim 20, wherein:
first gaps between the first edges of the cutouts and an edge of the blocking layer cause, at least in part, the optical density of the blocking layer to be greater than about 2.5 at the edge of the blocking layer.

29. The liquid crystal display of claim 28, wherein:
a second gap between the edge of the blocking layer and an edge of the gate line is greater than each of the first gaps.

30. The liquid crystal display of claim 19, wherein:
a dielectric constant of the blocking layer is less than about 50.

31. The liquid crystal display of claim 30, wherein the optical density of the blocking layer is greater than about 2.5.

32. The liquid crystal display of claim 31, wherein:
first gaps between the first edges of the cutouts and an edge of the blocking layer cause, at least in part, the optical density of the blocking layer to be greater than about 2.5 at the edge of the blocking layer.

33. The liquid crystal display of claim 32, wherein:
a second gap between the edge of the blocking layer and an edge of the gate line is greater than each of the first gaps.

34. The liquid crystal display of claim 19, wherein:
an optical density of the blocking layer is greater than about 2.5.

35. The liquid crystal display of claim 34, wherein:
first gaps between the first edges of the cutouts and an edge of the blocking layer cause, at least in part, the optical density of the blocking layer to be greater than about 2.5 at the edge of the blocking layer.

36. The liquid crystal display of claim 35, wherein:
a second gap between the edge of the blocking layer and an edge of the gate line is greater than each of the first gaps.

37. The liquid crystal display of claim 19, wherein:
first gaps between the first edges of the cutouts and an edge of the blocking layer cause, at least in part, an optical density of the blocking layer to be greater than about 2.5 at the edge of the blocking layer.

38. The liquid crystal display of claim 19, wherein:
a second gap between the edge of the blocking layer and an edge of the gate line is greater than each of the first gaps.

* * * * *